(12) United States Patent
Becher et al.

(10) Patent No.: US 12,130,364 B2
(45) Date of Patent: Oct. 29, 2024

(54) MEASUREMENT SYSTEM FOR A CONSTRUCTION MACHINE

(71) Applicant: MOBA Mobile Automation AG, Limburg (DE)

(72) Inventors: Dominik Becher, Limburg (DE); Torsten Schönbach, Limburg (DE); Jaroslaw Jurasz, Limburg (DE); Andreas Wolff, Limburg (DE)

(73) Assignee: MOBA Mobile Automation AG, Limburg (DE)

( * ) Notice: Subject to any disclaimer, the term of this patent is extended or adjusted under 35 U.S.C. 154(b) by 636 days.

(21) Appl. No.: 17/118,022

(22) Filed: Dec. 10, 2020

(65) Prior Publication Data
US 2021/0181354 A1  Jun. 17, 2021

(30) Foreign Application Priority Data

Dec. 11, 2019  (EP) .................................... 19215116

(51) Int. Cl.
*G01S 19/01* (2010.01)
*E01C 23/01* (2006.01)
(Continued)

(52) U.S. Cl.
CPC .............. *G01S 19/01* (2013.01); *E01C 23/01* (2013.01); *G01J 5/12* (2013.01); *G07C 5/06* (2013.01);
(Continued)

(58) Field of Classification Search
CPC .......... G01S 19/01; E01C 23/01; E01C 19/48; G07C 5/06; G01J 2005/0077; G01J 2005/123; G01J 5/12
See application file for complete search history.

(56) References Cited

U.S. PATENT DOCUMENTS

| 10,184,838 B2 | 1/2019 | Becher et al. |
| 10,473,637 B2 | 11/2019 | Schoenbach et al. |

(Continued)

FOREIGN PATENT DOCUMENTS

| CN | 102691251 A | 9/2012 |
| CN | 104101434 A | 10/2014 |

(Continued)

OTHER PUBLICATIONS

Horn-Schunck method—Wikipedia; https://en.wikipedia.org/wiki/Horn-Schunck_method, Jan. 15, 2021.
(Continued)

*Primary Examiner* — James M McPherson
*Assistant Examiner* — Kyle J Kingsland
(74) *Attorney, Agent, or Firm* — PERKINS COIE LLP; Michael A. Glenn

(57) ABSTRACT

A measurement system for a construction machine, in particular a road construction machine including a temperature measuring device and an evaluation device. The temperature measuring device is configured to determine a first surface temperature for a first area of a measuring field as well as a second surface temperature for a second area of the measuring field, the temperature measuring device being directed to a reference surface, in relation to which the construction machine is moving, and the measuring field being shifted as a function of a movement of the construction machine along the reference surface. The evaluation device is configured to determine a movement parameter by means of a shift in a first temperature zone, defined for a first point in time by the first surface temperature within the first area, in relation to the first and/or second area(s) or in relation to the measuring field.

20 Claims, 14 Drawing Sheets

(51) Int. Cl.
 *G01J 5/00* (2022.01)
 *G01J 5/12* (2006.01)
 *G07C 5/06* (2006.01)
(52) U.S. Cl.
 CPC . *G01J 2005/0077* (2013.01); *G01J 2005/123* (2013.01)

(56) References Cited

U.S. PATENT DOCUMENTS

| | | |
|---|---|---|
| 10,482,330 B2 | 11/2019 | Buschmann et al. |
| 2014/0308073 A1 | 10/2014 | Delius |
| 2014/0308074 A1 | 10/2014 | Rutz et al. |
| 2016/0042235 A1 | 2/2016 | Buschmann et al. |
| 2016/0061755 A1 | 3/2016 | Delius et al. |
| 2016/0131633 A1 | 5/2016 | Schoenbach et al. |
| 2017/0178428 A1* | 6/2017 | Watermann ............ B60K 35/00 |
| 2020/0025970 A1* | 1/2020 | Buschmann ............ B60Q 9/00 |

FOREIGN PATENT DOCUMENTS

| | | |
|---|---|---|
| CN | 105333959 A | 2/2016 |
| CN | 105387939 A | 3/2016 |
| CN | 105586821 A | 5/2016 |
| CN | 106322687 A | 1/2017 |
| CN | 108318706 A | 7/2018 |
| CN | 207780051 U | 8/2018 |
| CN | 109844476 A | 6/2019 |
| DE | 202009016129.3 U1 | 3/2010 |
| DE | 202013001597.7 U1 | 4/2013 |
| DE | 202013001597 U1 | 4/2013 |
| DE | 102014222693 A1 | 5/2016 |
| DE | 102016207584.5 B3 | 6/2017 |
| EP | 2789741 A1 | 10/2014 |
| EP | 2982951 A1 | 2/2016 |
| EP | 2990531 A1 | 3/2016 |
| EP | 3112812 A1 | 1/2017 |
| EP | 3270109 A1 | 1/2018 |
| EP | 3456880 A1 | 3/2019 |
| JP | 2013113636 A | 6/2013 |
| WO | 0070150 A1 | 11/2000 |
| WO | 2018056894 A1 | 3/2018 |

OTHER PUBLICATIONS

Völkel Pave Navigator—www.voelkel.de, 2017.
Jin Shou feng, Hu Yong biao, Machine-vision-based study on driving speed of construction machinery. Chinese Journal of Construction Machinery, vol. 10 No. 4Dec. 2012, pp. 446-451, Dec. 15, 2012 (English abstract contained).

\* cited by examiner

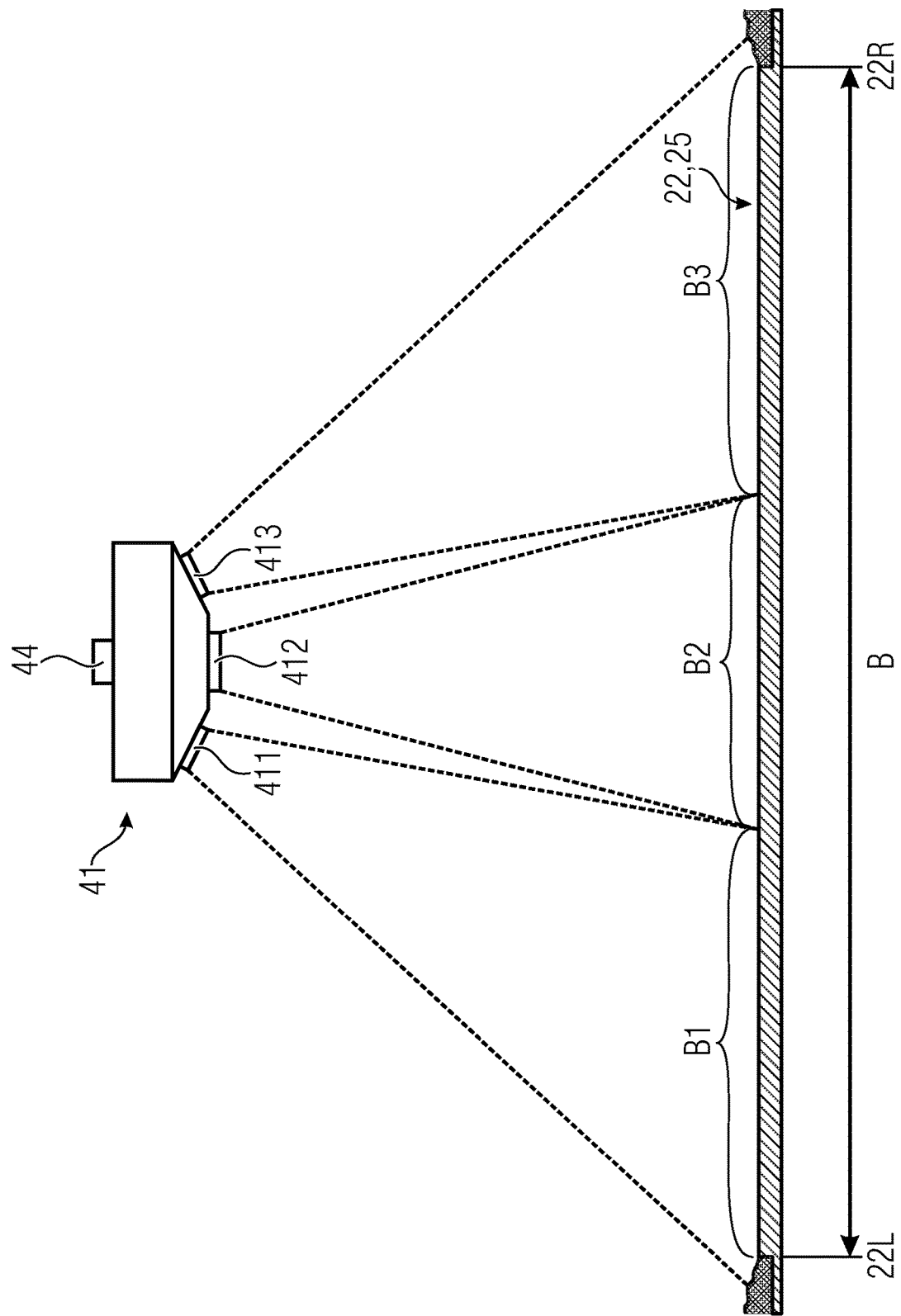

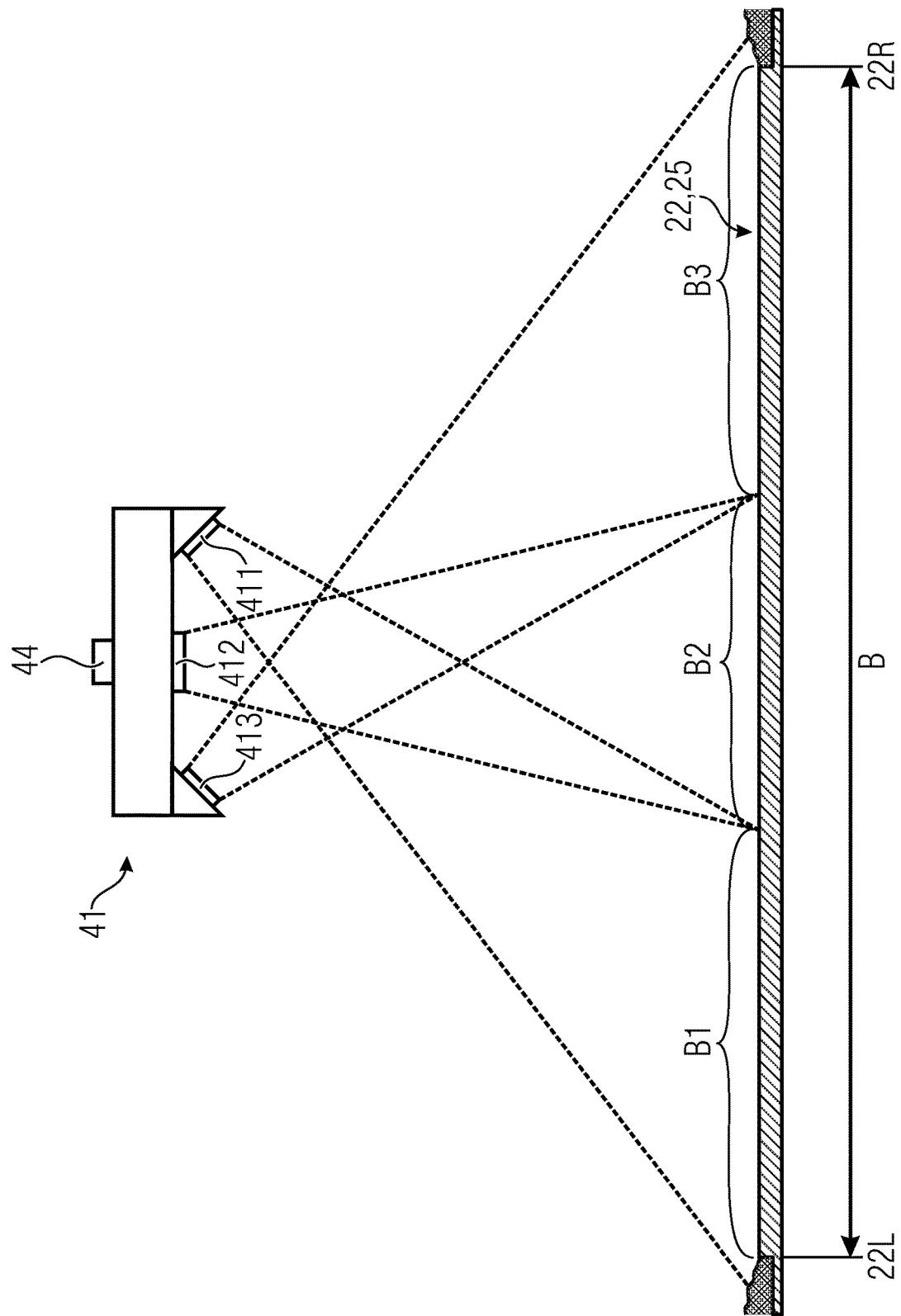

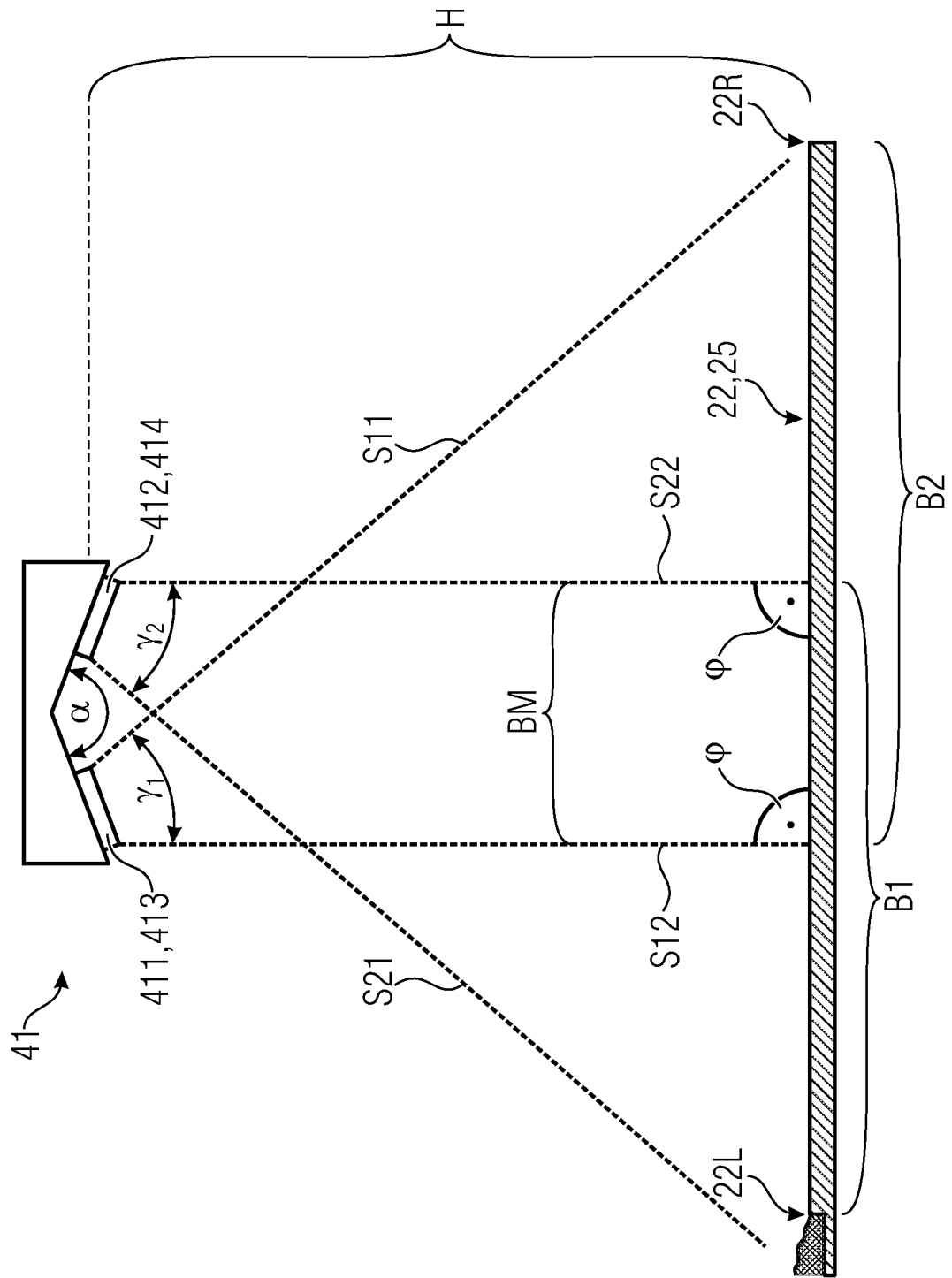

MEASUREMENT SYSTEM FOR A CONSTRUCTION MACHINE

CROSS-REFERENCE TO RELATED APPLICATION

This application claims priority from European Patent Application No. EP 19215116.5, which was filed on Dec. 11, 2019, and is incorporated herein in its entirety by reference.

BACKGROUND OF THE INVENTION

Embodiments of the present invention relate to a measurement system for a construction machine and to construction machines per se. Further embodiments relate a corresponding method and computer program, respectively. Generally, the invention is in the field of construction machines, in particular construction machines on wheels, such as a road finishing machine (road finisher or road paver). Advantageous embodiments provide a measurement system for determining a movement parameter such as, e.g., a speed (of travel) of the construction machine while using a device for measuring the temperature.

In general, a road finisher comprising a tracked or wheeled undercarriage runs on a prepared foundation (road bed) onto which a road surface or road pavement to be produced is to be applied. In the direction of travel, a height-adjustable screed is provided behind the road finisher and has a supply of the road paving material piled on its front side which is distributed and tracked by a conveyor which ensures that the amount of road paving material kept in store on the front side of the screed is typically sufficient but not too large. The height of the rear edge of the screed relative to the surface of the prepared foundation, which foundation may also be formed by an already existing road pavement covering, determines the thickness of the road surface, that has been produced, prior to its subsequent further consolidation by means of rollers. The screed is held at traction arms that are mounted to be rotatably movable about traction points arranged in the center area of the road finisher, the height of the screed being determined by hydraulic adjusting means.

With road building projects, such as building a new road or renewing a damaged road surface, the quality of the newly applied road building material typically is to be documented by the companies in charge by using check tests. Said tests include measuring the temperature of the asphalt layer directly after having been mounted by the road finisher. The temperature of the newly applied road building material is measured across the entire installation width directly behind the screed of the road finisher.

A roadway temperature monitoring system comprising a temperature sensor is known from WO 2000/70150 A1, which temperature sensor here may either by a thermal-imaging camera, a thermal scanner or a thermal-imaging camera operating in a "line scan" mode. The temperature sensor is arranged at the rear end of a road finisher, so that the entire width of the newly applied asphalt layer is scanned. The captured temperature values may be graphically displayed on a display device.

In addition, a device for measuring the temperature of the surface of hot asphalt, consisting of an infrared temperature measuring head moving in the direction transverse to the direction of travel, a motor for moving said sensor, and a controller, has already been known from DE 20 2009 016 129 U1, DE 20 2013 001 597 U1, DE 10 2014 222 693 A1 or DE 10 2016 207 584 B3.

CN 102691251 A describes a temperature measurement system for a road finisher which comprises individual infrared temperature sensors which are arranged on a beam mounted behind the road finisher in the direction transverse to the direction of travel.

Further known systems for determining the temperature of a newly mounted road pavement are described, e.g., in EP 2 789 741 A1, EP 2 982 951 A1 or EP 2 990 531 A1.

Moreover, an area temperature sensor for measuring the temperature of the asphalt layer directly following installation by the road finisher is known which is manufactured by Völkel Mikroelektronik GmbH, Munster, Germany.

Furthermore, EP 3 112 812 A1 and EP 3 270 109 A1 describe devices and methods for measuring the distance covered at a construction machine comprising a crawler track drive, comprising a contactless sensor for being arranged at the chassis of the construction machine, the contactless sensor being directed to the crawler track of the crawler track drive of the construction machine. An evaluation unit is connected to the contactless sensor and is effective to determine a distance covered by the construction machine on the basis of the signals received by the contactless sensor.

In conventional technology, the temperature data is stored together with positional data obtained, e.g., by means of GPS. What is problematic is that the local resolution of GPS lies only within the meter range, or sometimes even within the range of several meters, and that, consequently, additional information may be used for the purpose of accurately determining the position. Therefore, in this respect there is a need for an approved approach.

SUMMARY

According to an embodiment, a measurement system for a construction machine, in particular a road construction machine, may have: a temperature measuring device configured to determine a first surface temperature for a first area of a measuring field of the temperature measuring device as well as a second surface temperature for a second area of the measuring field of the temperature measuring device, the temperature measuring device being directed to a reference surface, in relation to which the construction machine is moving, and the measuring field of the temperature measuring device being shifted as a function of a movement of the construction machine along the reference surface; and an evaluation device configured to determine a movement parameter by means of a shift in a first temperature zone, defined for a first point in time by the first surface temperature within the first area, in relation to the first and/or second area(s) or in relation to the measuring field of the temperature measuring device.

According to another embodiment, a construction machine, in particular road construction machine, may have a measurement system for a construction machine, in particular a road construction machine, which measurement system may have: a temperature measuring device configured to determine a first surface temperature for a first area of a measuring field of the temperature measuring device as well as a second surface temperature for a second area of the measuring field of the temperature measuring device, the temperature measuring device being directed to a reference surface, in relation to which the construction machine is moving, and the measuring field of the temperature measuring device being shifted as a function of a movement of the construction machine along the reference surface; and an evaluation device configured to determine a movement parameter by means of a shift in a first temperature zone, defined for a first point in time by the first surface temperature within the first area, in relation to the first and/or second area(s) or in relation to the measuring field of the temperature measuring device.

According to yet another embodiment, a method of determining a movement parameter for a construction machine, in particular a road construction machine, may have the steps of: determining a first surface temperature for a first area of a measuring field of the temperature measuring device and determining a second surface temperature for a second area of the measuring field of the temperature measuring device by means of a temperature measuring device, said temperature measuring device being directed to a reference surface, in relation to which the construction machine is moving, and the measuring field of the temperature measuring device being shifted as a function of a movement of the construction machine along the reference surface; and determining a movement parameter by means of a shift in a first temperature zone, defined for a first point in time by the first surface temperature within the first area, in relation to the first and/or second area(s) or in relation to the measuring field of the temperature measuring device.

According to yet another embodiment, a non-transitory digital storage medium may have a computer program stored thereon to perform the inventive method, when said computer program is run by a computer.

Embodiments of the present invention provide a measurement system for a construction machine, in particular a road construction machine. The measurement system includes a temperature measuring device and an evaluation device. The temperature measuring device (e.g., a thermopile array) is configured to determine a first surface temperature for a first area of a measuring field of the temperature measuring device as well as a second surface temperature for a second area of the measuring field of the temperature measuring device, the temperature measuring device (and, thus, the measuring field) being directed to a reference surface, in relation to which the construction machine is moving, and the measuring field being shifted as a function of a movement of the construction machine along the reference surface. The evaluation device is configured to determine a movement parameter by means of a shift in a first temperature zone, defined for a first point in time by the first surface temperature within the first area, in relation to the first and/or second area(s) or in relation to the measuring field.

With regard to the temperature zone, it shall be noted that said temperature zone is shifted, in accordance with embodiments, across the measuring field (from area to area), or is shifted out of the measuring field. At temperature zone is defined by a prevailing surface temperature within a local area (e.g. several pixels) at a first point in time. Since mapping (imaging) is shifted to this area in a planar manner, e.g. into the second area or toward the second area, the first area and the temperature zone will coincide only at the first point in time, whereas at a second point in time, the first temperature zone will be located in a newly defined local area (other pixels).

Embodiments of the present invention are based on the finding that by means of the temperature measuring device which is present anyway and which is configured, e.g., as thermal-imaging camera, a thermopile array or a pyrometer array and which enables local resolution of temperature zones, a movement parameter may be determined at the same time, as it were. These temperature zones, i.e., minute local temperature differences, may be identified within a thermographic camera image or, generally, while using an array, so that shifting of said temperature zones, which are thus identified, as a result of a movement of the construction machine may be employed for determining a movement parameter. For example, it would be feasible to determine the speed. By observing/tracking a local temperature zone (temperature field) i.e., a zone having a first surface temperature, which migrates across the measuring field, one may recognize the extent to which a shift in the measuring field (field of view of the camera) has taken place. Starting from the assumption that the temperature measuring device is rigidly directed (at least during operation) to the foundation and/or to the asphalt layer that has been applied and/or, generally, to a reference surface in relation to which the construction machine is moving, the shift in the temperature zones is caused by the movement of the construction machine, so that a movement parameter such as the speed of the construction machine may be determined by determining the shift. This method is advantageous since in this manner, a movement or a movement parameter (such as the speed, the direction of movement or the distance covered) may be determined with high accuracy, e.g. within the centimeter range. Within this context, it is advantageous that effects such as the slip of the undercarriage or inaccuracies in GNSS/GPS signals have no influence.

Embodiments of the present invention relate to field of construction machines, in particular to determining the speed (of travel) (generally, determining movement parameters) of a construction machine while using a device for determining the temperature of a road construction material such as asphalt, bitumen, an asphalt mix or the like which has been newly applied by a construction machine, in particular a road finisher, within an installation width. Further parameters such as a distance covered, etc., may be determined from the speed (of travel). It shall be noted that the reference surface may be located in front of and/or behind and/or on the side of (adjacent to) the construction machine.

In accordance with embodiments, the position and/or the path and/or the regulation parameter may be compared and adjusted to a GNSS signal (or vice versa). This is why the measurement system in accordance with embodiments includes at least one GNSS receiver and/or a GPS receiver for determining the position. In this context, it is also feasible to obtain a GNSS signal in combination with a correction signal for the GNSS signal, e.g., with a correction signal from a stationary transmitter or a geostationary transmitter, or to obtain a GNSS signal in combination with a supplementary signal for the GNSS signal (e.g. from a stationary or geostationary transmitter). This correction signal, or the supplementary signal, significantly increases accuracy. For example, the GNSS receiver may be supplemented by a real-time kinematic radio receiver (RTK GNSS), by means of which the positional data (coordinates) may be corrected with a very high level of accuracy. Alternatively, utilization of other correction data services is also feasible. Moreover, a terrestrial system may also be used, such as a total station having a prism arranged on the construction machine, or position finding may be performed while using locating techniques from the field of mobile radio technology, for example by means of GSM triangulation. What is also conceivable in this context is a combination of a global navigation satellite system and a terrestrial system, e.g. utilization of the so-called "differential GPS".

In accordance with embodiments, therefore, the movement parameter is detected by means of a shift, based on a heat change and/or a changing (inhomogeneous) heat distribution, in the first surface temperature across the first and/or second area(s). On the basis of the exemplary assumption that the shift along a direction of movement of the construction machine is a result of the movement of the construction machine, the shift direction may thus be detected. In accordance with advantageous embodiments, the actual expansion of the first and second areas, e.g., several pixels, may be determined while using the respective mapping (imaging) scale, so that each pixel shift has a real path associated with it. If one looks at this quantity in relation to the time taken for the shift to occur, the speed of movement may also be detected in this manner. In accordance with embodiments, observation of the shift takes place across several frames associated with different points in time. An alternative movement parameter is the course of a skirt (e.g. between two asphalt layers that have been or are to be installed adjacently) in relation to the construction machine.

In accordance with embodiments, the distance covered (relative position as compared to the start of the measurement) may obviously also be detected; when one knows an absolute position, e.g., on the basis of the GNSS signal, an updated absolute position may also be determined. Also, it is possible, in accordance with embodiments, to determine a movement status of the construction machine, e.g. to detect a "halt" (stopped position) or a "start-up". Determining a "halt" and a "start-up" of the construction machine (of the road finisher) is almost impossible by using a GPS module since this signal, or the position, mostly "fluctuates" heavily (so-called "random walk") and therefore is not sufficiently accurate for this purpose. In addition, a GNSS/GPS signal per se is not always available (e.g. under bridges or in tunnels, etc.).

In accordance with further embodiments it shall be noted that the first and second areas may be directly adjacent to each other, each area being characterized by its own surface temperature. Consequently, e.g., the second area having a second surface temperature may surround the first area (local aspect) having a second surface temperature. In addition, there may obviously also be further (third) areas which are defined by other pixels and other surface temperatures. For determining movement parameters, one advantageously selects areas arranged along the direction of movement.

In accordance with embodiments, it is possible that the means for determining the temperature also determine the asphalt temperature when the asphalt layer, which serves as a reference surface, is installed; advantageously, the temperature measurement values regarding the asphalt layer may be stored together with the respective (relative/absolute) position/path.

In accordance with further embodiments, the temperature measuring device includes a thermopile array or pyrometer array. In addition, in accordance with further embodiments, the temperature measuring device may include at least two arrays. Said arrays are arranged, e.g., next to one other or one behind the other and are directed to two adjacent measuring fields, or are directed to an overlapping area of the measuring fields of the arrays. Directing the arrays to an overlapping area of the measuring fields enables, in accordance with embodiments, a distance of the temperature measuring device to the reference surface (installation or mounting height of the temperature measuring device) may be determined, or calculated, by the temperature measuring device, in particular by a processing unit arranged therein, such as a microcontroller, for example, or by the evaluation device. It is also possible to direct the arrays to an area of overlap of the measuring fields, such that upon a change in the distance of the temperature measuring device to the reference surface, the area of overlap of the measuring fields, which is detected by the arrays, remains the same in terms of its width in the direction transverse to the construction machine's direction of travel and/or movement.

A further embodiment relates to a construction machine, in particular to a road construction machine such as a road finisher or a road roller comprising a corresponding measurement system.

A further embodiment provides a method of determining a movement parameter for a construction machine. The method includes the following steps:

determining a first surface temperature for a first area of a measuring field and determining a second surface temperature for a second area of the measuring field by means of a temperature measuring device, said temperature measuring device being directed to a reference surface, in relation to which the construction machine is moving, and the measuring field being shifted as a function of a movement of the construction machine along the reference surface;

determining a movement parameter by means of a shift in a first temperature zone, defined for a first point in time by the first surface temperature within the first area, in relation to the first and/or second area(s) or in relation to the measuring field.

In accordance with further embodiments, the method may be performed by using a computer program.

BRIEF DESCRIPTION OF THE DRAWINGS

Embodiments of the present invention will be detailed subsequently referring to the appended drawings, in which:

FIGS. 3a-j show possible implementations of the temperature measuring device for the measurement system in accordance with extended embodiments;

DETAILED DESCRIPTION OF THE INVENTION

Figure 1:
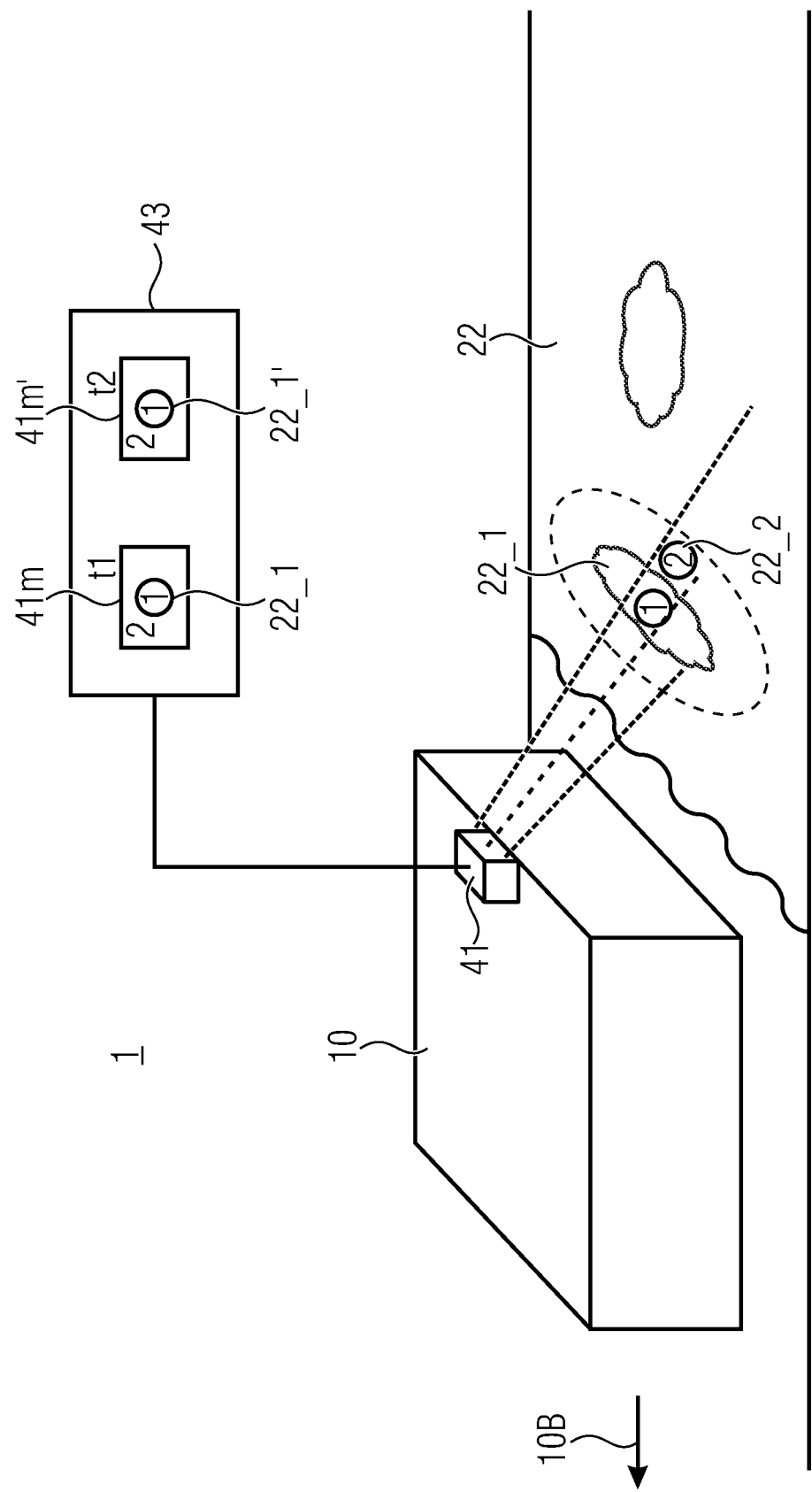
FIG. 1 shows a schematic representation of a measurement system in accordance with a basic embodiment.

Before embodiments of the present invention will be explained by means of the accompanying drawings, it shall be noted that elements and structures which are identical in action have been provided with identical reference numerals, so that their descriptions are mutually applicable, or interchangeable. Also, it shall be noted that even though the present invention has been described by means of a road finisher, it may also be applied in a road roller.

FIG. 1 shows a measurement system 1 for a road finisher 10. The measurement system 1 includes at least one temperature measuring device 41 as well as an evaluation means 43. The temperature measuring device 41, which is configured as a thermopile array, for example, is directed to a reference surface, which here is the asphalt surface 22 that has just been applied. The asphalt surface 22 is still hot from the asphalting process, so that a surface temperature is obtained. This surface temperature varies locally, as depicted by the two temperature spots 22_1 and 22_2. In the consideration which follows, it shall be assumed that the temperature measuring device 41 has its measuring field 41*m* directed to the reference surface 22 such that the spots 22_1 and 22_2 are located within the measuring field. Each of said areas 22_1 and 22_2 has its own surface temperature, so that, for example, the temperature zone 22_1 may be detected within the measuring field 41*m* at the time T=1 (t1). Said temperature zone 22_1 extends across a local area having a de-terminable expansion, said local area being mapped (imaged) onto several pixels of the measuring device 41. The boundary between the areas 22_1 and 22_2 may be determined in a pixel-precise manner, for example. On the basis hereof, it is therefore possible to associate a position, or, to be precise, a relative position in relation to the measuring field 41, with the boundary or, generally, with the temperature zone 22_1.

Due to the movement of the road finisher 10 along the direction of movement 10B, the measuring field 41*m* (time t1) will shift for the time t2, so that the measuring field 41*m*' results. This measuring field now maps (images) a new section of the reference surface (of the asphalt) 22 as a function of the movement 10B (speed of movement and direction of movement).

The temperature zone 22_1, which is located within the first area at the time t1, will shift, due to the shift in the measuring field 41*m*, toward the second area (cf. time t1) and will consequently be located within a new first area 22_1' at the time t2. Said new first area 22_1' will be located at a different position within the measuring field 41*m*' at the time t2. This shift in position (e.g., by 20 pixels) is to be associated with a distance covered on the basis of the mapping (imaging) scale, which is typically known.

Thus, the evaluation device 43 tracks the temperature zone(s) 22_1 and/or 22_1' across the frames, or times t1, t2 so as to detect a corresponding movement parameter. In accordance with an embodiment, tracking is therefore understood to mean a shift in the temperature zone 22_1, which is located within the first area at the time t1, in relation to the second area 22_2 at the time t1 if the system establishes, for example, that the temperature zone 22_1 now is located within the area of the second temperature zone (area is defined by pixels, for example) at the time t2. Alternatively, tracking of the temperature zone 22_1 may also be effected such that only the first area (pixel area) is considered, and that the system thus establishes that the temperature zone 22_1 is no longer arranged within the same area at the time t2. A further alternative would be to track a temperature zone, here the temperature zone 22_1, in relation to the edges of the measuring field 41*m*. For example, the system may establish that at the time t1, x pixels were counted up to the edge in the direction of travel 10B, whereas x+/−y pixels are obtained at the time t2. Thus, it is possible to employ the temperature measuring device 41 not only to measure the temperature of the surface 22 of a newly installed road pavement (e.g., hot asphalt), but also to determine, while using the evaluation device 43, a movement parameter such as the speed (of travel) or further movement parameters of the road finisher 10 with very high or with considerably higher precision than in conventional technology from the temperature data measured. The background to this is that the road finisher 10, which during the installation of asphalt in most cases moves at a very low speed (of travel) within the range of about 2 to 20 m per minute, exhibits such a low speed that said speed may often be difficult to determine with accuracy. If, therefore, one has determined the distance covered within the respective time frame (delta between t1 and t2), the speed of travel will therefore be known.

On this basis or, generally, on the basis of the temperature measuring data, further parameters such as the distance covered, for example, may also be calculated in accordance with embodiments.

In accordance with embodiments, it would also be possible to determine a status of movement. For example, a "halt" (stopped state) may be detected as soon as no more offset occurs. It is almost impossible to determine a "halt" and a start-up of the road finisher 10 by using a GPS module since the signal and/or the position in most cases "fluctuates" heavily (so-called "random walk") and therefore is too imprecise for this purpose. Moreover, a GNSS/GPS signal per se is not always available (e.g., under bridges or in tunnels, etc.).

In addition to a halt, the same problems apply to determining a start-up process by means of GNSS/GPS. Via the change in the speed of travel, start-up processes may also be readily detected by means of the temperature measurement data. Consequently, it is possible, on the basis of the fundamental task of achieving accuracy, to solve a further problem, namely the fact that—independently of the position of the road finisher (inside a tunnel, under bridges, in urban canyons, . . . )—the measurement system 1 provided here serves to continually determine the position. Since, in particular, the relative position becomes determinable by means of the system 1, said relative position may be compared and adjusted to GNSS/GPS data so as to calculate an absolute position on the basis of the relative position.

It would thus be possible, in accordance with embodiments, for the evaluation device 43 to access the positional data of the machine, e.g., of the GPS system (similarly to the path measurement systems and measuring devices of EP 3 112 812 A1 and EP 3 270 109 A1 that are mentioned in conventional technology). In addition, this also enables the evaluation device 43 to perform a comparison and adjustment in the sense of a correction. Here, the evaluation unit 43 therefore is configured to correct, at predetermined intervals, the covered distance of the positional data from the positioning means (not depicted).

As is already known from the temperature measuring device mentioned with regard to conventional technology, the installation temperature is a critical process quantity in road construction and has a considerable influence, e.g., on the lifetime of the new road. It is also largely known from practice that a high-quality road pavement also involves a mainly constant installation speed without any "halting" and "starting up" of the road finisher since otherwise what may occur is unmixing of materials such as "hot spots" or "cold spots", i.e., areas in the road pavement where the material was installed at a sub-optimum temperature. This is described in EP 3 456 880 A1, for example. Thus, there is a direct connection between temperature measurement of the surface of a newly installed road pavement and the above-described parameters of "speed (of travel)", "halting" and "starting up" of the road finisher.

Therefore, these quality-determining parameters are established together by the system 1 provided here (actually, they are established solely by the temperature sensing device 41 with the evaluation device 43).

A further advantage consists in that the path measurement system shown here (measurement system 1 for determining a movement parameter) operates in a "slip-free" manner.

In addition, in known path measurement systems, there is the problem of "slip", i.e., most path measurement systems such as the path measurement devices, mentioned with regard to conventional technology, of EP 3 112 812 A1 or of EP 3 270 109 A1 or a wheel sensor located at the wheel hub (mostly used in the United States), are susceptible to slip, or are not entirely "slip-free".

In accordance with advantageous embodiments, the sensor 41 is configured as a thermopile array. A further advantage in embodiments consists in that no mechanically moveable parts exist in the temperature measuring device. In the temperature measuring devices known from conventional technology, for example, the infrared temperature sensor is continuously moved to and fro in the temperature scanner mentioned. A thermal-imaging camera typically has a "shutter", i.e., a mechanically moveable part.

In addition, the invention reduces the number of sensor systems that are present at the machine since no additional speed (of travel) and/or path measurement system is required.

With regard to FIGS. 2a and 2b, details of the measurement system will be explained below.

Figure 2A:
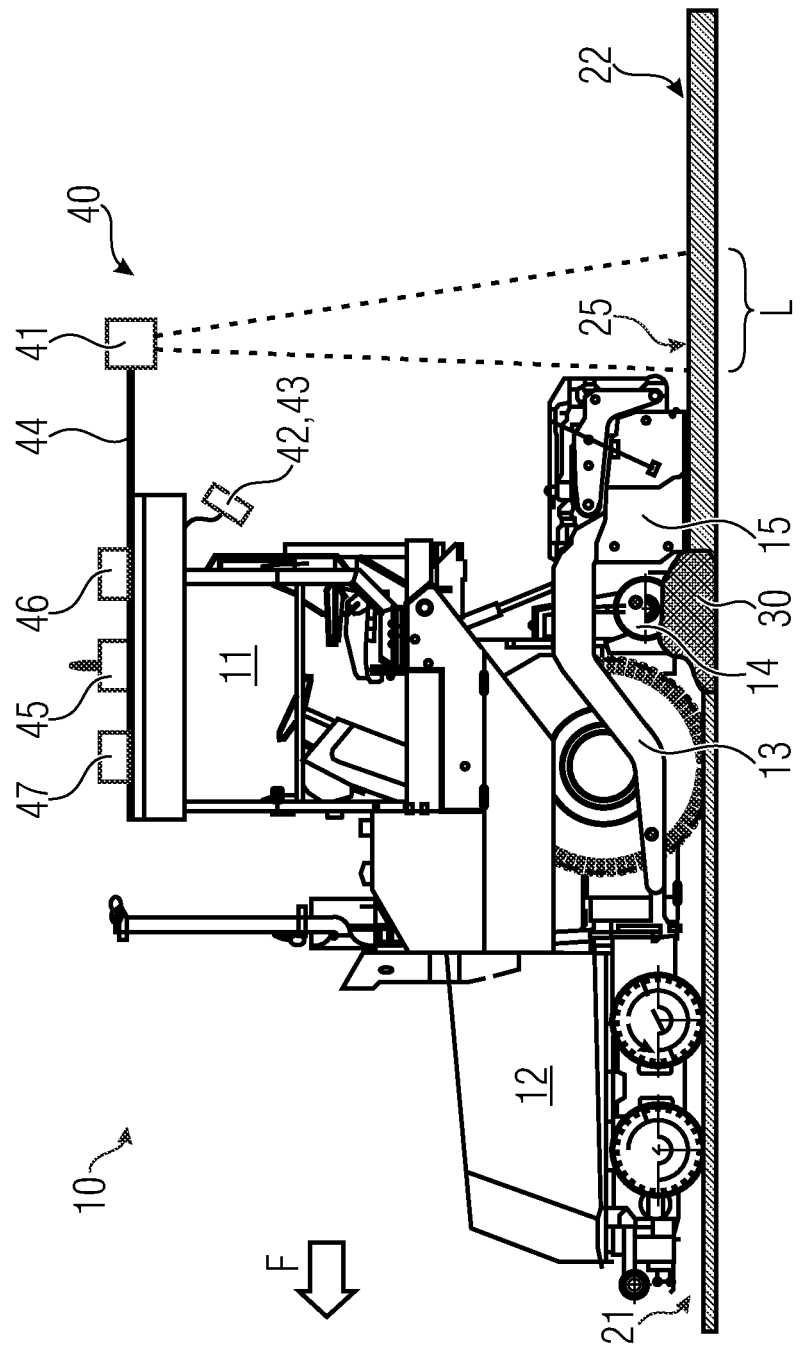
FIGS. 2a, b show schematic representations of the installation of the measurement system at a road finisher in accordance with an embodiment.

FIG. 2a schematically shows a self-driving road finisher 10 in a lateral view as an example of a construction machine. As is known, the road finisher 10 includes a material bunker 12 for accommodating construction material or road pavement material 30 such as asphalt, road metal (gravel) or the like as well as a screed or screed board 15 arranged at traction arms 13 and pulled by the drive unit, or tractor unit, of the road finisher 10. During material installation, the road finisher 10 moves, in the direction of travel F, on a surface of the foundation 21 to be asphalted. In front of the screed 15, a distribution worm 14 is arranged which distributes the construction material/road pavement material 30 which is to be installed and which is transported, during installation, from the material bunker 12 toward the distribution worm 14 via conveyer belts (not depicted), in front of the screed 15 in a direction that is transverse to the direction of travel of the road finisher 10, so that the construction material/road pavement material 30 to be installed is available, during installation, in an approximately uniform amount in front of the screed 15. Above the distribution worm 14 and the non-depicted conveyer belts, there is an operator's cab 11 from which the machine 10 and others is steered.

The road finisher 10 has a temperature sensing system 40 arranged thereat so as to sense the temperature of the surface of a newly installed (asphalted) road pavement 22 immediately following installation by the road finisher 10. For this purpose, the temperature sensing system 40 includes a temperature measuring device 41 attached to a carrier 44. The temperature measuring device 41 is arranged at the carrier 44 such that the temperature of the surface of the newly installed road pavement 22 may be advantageously measured directly behind the rear edge of the screed within the sensing area 25. The temperature measuring device 41 may be releasably attached to the carrier 44; for example, it may be screwed or clamped or attached by means of a magnetic fastener, so that the temperature measuring device 41 may simply be demounted once the construction work is finished, for example, for reasons of protection from theft. As depicted in the figures, for example, the carrier 44 in turn is attached to the roof of the road finisher 10; however, other places of attachment at the machine 10, for example at the screed 15, are also feasible. Advantageously, the carrier 44 consists of one single mechanical part or of individually connectable mechanical parts or of individual telescopic parts so as to be able to set the temperature measuring device 41 accordingly at an optimum distance (when viewed in the direction of travel F of the road finisher 10) from the rear edge of the screed so that the temperature of the surface of the newly installed road pavement 22 may be sensed directly behind the rear edge of the screed.

The temperature sensing system 40 further includes an operating and display device 42 and a process calculator unit and/or evaluation means 43 as well as a communication device 45, a weather station 46 and a position finding means 47. The latter components of the temperature sensing system 40, i.e., the communication device 45, the weather station 46 and the position finding means 47, are advantageously attached to the roof of the road finisher 10 (as depicted in the figures), but may also be attached, e.g., to the carrier 44 to which the temperature measuring device 41 is also attached. All of the components of the temperature sensing system 40 are advantageously electrically connected to the process calculator unit and/or the evaluating means 43 via cable connections. The process calculator unit and/or evaluation means 43 receives the measured temperature data from the temperature measuring device 41 so as to read said data in and to process it further accordingly. For example, measured temperature data may be linked and/or combined with positional data so as to store said data in the process calculator unit and/or evaluation means 43. This enables, e.g., subsequent localization of potential voids in the surface of the newly installed road pavement 22. Also, there is the possibility to be able to transmit temperature data and the related positional data to an external device or a different construction vehicle, for example a road roller travelling behind the road finisher 10, by means of the communication device 45. Data of the weather station 46 may also be taken into account in the further processing of temperature data; for example, said weather-station data may be stored together with temperature and positional data for subsequent further processing.

The process calculator unit and/or evaluation means 43 is electrically connected to the display and operating device 42, which serves as a so-called human/machine interface (MMI). An operator, for example the screed personnel, may monitor, e.g., the curve and/or the profile of the measured temperatures during installation by means of the display and operating device 42 and may thus identify voids in the surface of the newly installed road pavement 22 (and may possibly take further measures) as early as during installation. In addition, parameters and further settings may be made to the temperature sensing system 40 by the operating personnel by means of the display and operating device 42, for example for the purposes of calibrating the temperature measuring device 41 or for changing or adapting the screen display. In an advantageous variant, the processor calculating unit/evaluation means 43 and the operating and display device 42 are combined in one device and/or in one housing, i.e., integrated into one device or housing. As depicted in the figures, the process calculator unit/evaluation means 43 and the operating and display device 42 are arranged directly below the roof of the road finisher 10 in the rear area of the operator's cab 11. As a result, on the one hand, the screen of the operating and display device 42 is readily readable for the screed personnel, and on the other hand, the temperature values measured are displayed directly in the area of the actual temperature measurement, i.e., in the area of the temperature measuring device 41 and of the screed 15.

However, it is also feasible, depending on the type of embodiment of the temperature sensing system 40, for the process calculator unit/evaluation means 43 or at least a part thereof to be integrated into the temperature measuring device 41 so as to analyze temperature images, for example, within the temperature measuring device 41, or to perform a temperature image evaluation or to conduct calculations. This has the advantage that, e.g., large amounts of raw data of temperature values need no longer be transmitted via cable connections.

Figure 2B:
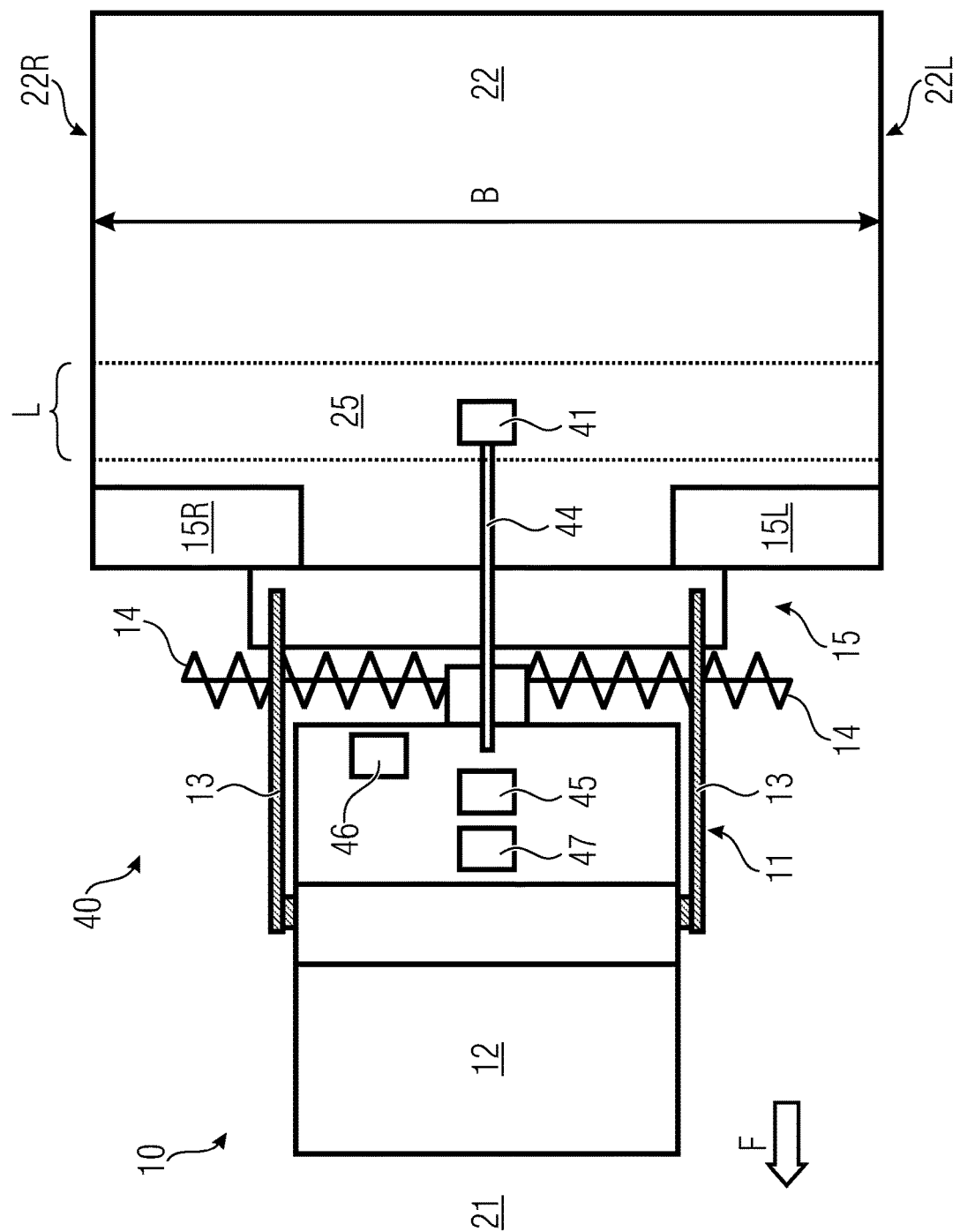

FIG. 2b schematically shows the self-driving road finisher 10, depicted in FIG. 2a, in a top view, i.e., when viewed from above. In addition to the components of the road finisher 10 which were already described with regard to FIG. 2a, one can see here that the screed 15 is a screed 15 that is variable by means of lateral pull-out elements 15L and 15R, whereby an installation width B of the newly installed road pavement 22 may be changed accordingly during installation. The newly installed road pavement 22 is laterally demarcated by edges 22L and 22R.

The temperature measuring device 41 which was already described above and is attached to the carrier 44 measures the temperature of the surface of the newly installed (asphalted) road pavement 22 immediately following installation by the road finisher 10, specifically within a sensing area 25 as depicted in FIGS. 2a/b. The sensing area 25 extends, when viewed in a direction transverse to the direction of travel F of the road finisher 10, across the entire installation width B as well as, when viewed in the direction of travel F of the road finisher 10, across a length L, so that at least a surface area B×L (sensing area 25) is sensed by the temperature measuring device 41. Since during material installation, the road finisher 10, as was already explained above, moves in the direction of travel F on a surface of the foundation 21 to be asphalted, the sensing area 25 will also move in the direction of travel F at the same speed as the road finisher 10. This means that the temperature measuring device 41 and, thus, also the sensing area 25 "migrate", during material installation, at the same speed as the road finisher 10 in the direction of travel F of the latter, the temperature measuring device 41 continuously measuring temperature values of the surface of the newly installed (asphalted) road pavement 22.

FIGS. 3a-3d as well as 3i and 3j schematically show various embodiments of the temperature measuring device 41; further implementations and/or arrangements—which are not described, in particular—may also be conceivable here. In all of the implementations depicted in the figures, the temperature measuring deice 41 is arranged at the carrier 44. However, it is also feasible to arrange one or more of the temperature measuring devices 41 directly, without the carrier 44, at the roof or at other suitable attachment locations of the road finisher 10 (e.g., at the screed 15) while using attachment mechanics adapted accordingly for this purpose. It is also feasible, when using several temperature measuring devices 41, for them to be arranged at the road finisher at different mounting heights as well as mutual distances.

In case of the temperature measuring device 41 of FIGS. 3a and 3b, the former includes three individual temperature sensors 411, 412 and 413, respectively, which are directed to the surface of the newly installed (asphalted) road pavement 22. Each of the individual temperature sensors 411, 412 and 413 senses, when viewed in the direction transverse to the direction of travel F of the road finisher 10, a subarea B1, B2 and B3 of the overall installation width B, the subareas B1, B2 and B3, when added together, resulting in the overall installation width B. The individual temperature sensors 411, 412 and 413 are arranged at an angle in relation to one another, such that the subareas B1, B2 and B3 that are to be sensed will slightly overlap in an advantageous manner so that no areas that are not sensed will arise between the subareas B1, B2 and B3.

In the embodiments according to FIGS. 3a and 3b, the temperature sensors 411 and 412 as well as 412 and 413 are arranged to be mutually twisted at an angle of approx. 220° (FIG. 3a, generally within a range between 180° and 270°) and approx. 140° (FIG. 3b, generally within a range between 90° and 180°), respectively (on this note, see the schematic representations in FIGS. 3e and 3f as well as their descriptions further below). Depending on the mounting height of the temperature measuring device 41 above the surface of the newly installed (asphalted) road pavement 22 at the road finisher 10, and/or depending on the mutual distances between the individual temperature sensors 411, 412, and 413, the angles exhibited by the temperature sensors 411, 412, and 413 in relation to one another may also deviate, or differ. One may well see in FIGS. 3a and 3b that in addition to the outer subareas B1 and B3, it is also the road edge areas going beyond the edge areas (edges) 22L and 22R of the newly installed (asphalted) road pavement 22 that are sensed by the temperature sensors. Consequently, with these embodiments it would also be possible to calculate the overall installation width, specifically by means of the temperature profile captured. Since those road edge areas that go beyond the edge areas (edges) 22L and 22R of the newly installed (asphalted) road pavement 22 exhibit a temperature that is considerably cooler than that of the newly applied asphalt 22, the edge areas (edges) 22L and 22R may be accurately sensed, so that the process calculator unit and/or evaluating means 43 would be capable of calculating an overall installation width B on the basis of the temperature profile.

Figure 3C:
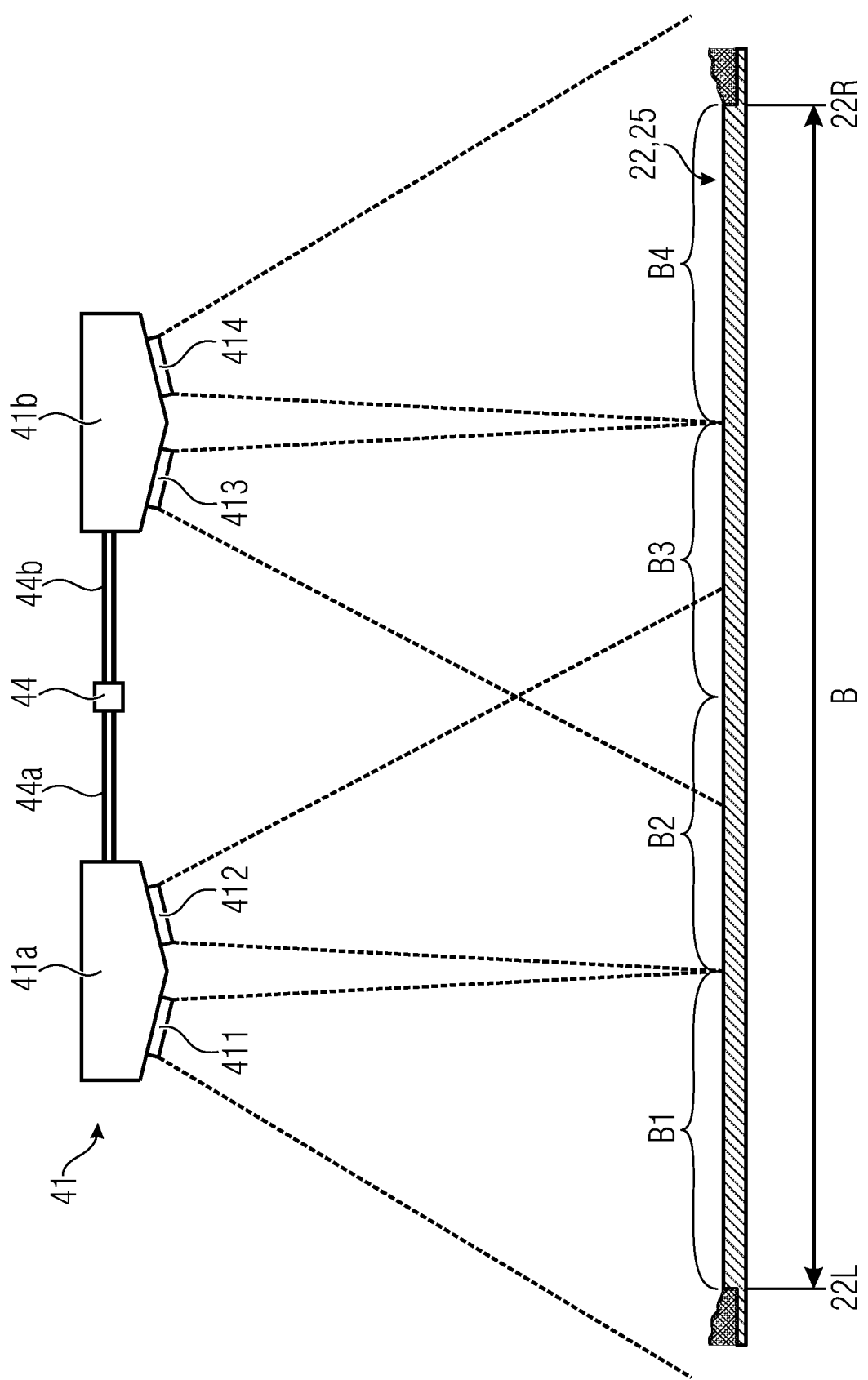

The temperature measuring device 41 in accordance with FIGS. 3a and 3b includes said three respective individual temperature sensors 411, 412, and 413. However, it is also feasible for the temperature measuring device 41 to include only two individual temperature sensors (as depicted in FIGS. 3c and 3d) or only one single temperature sensor.

Figure 3D:
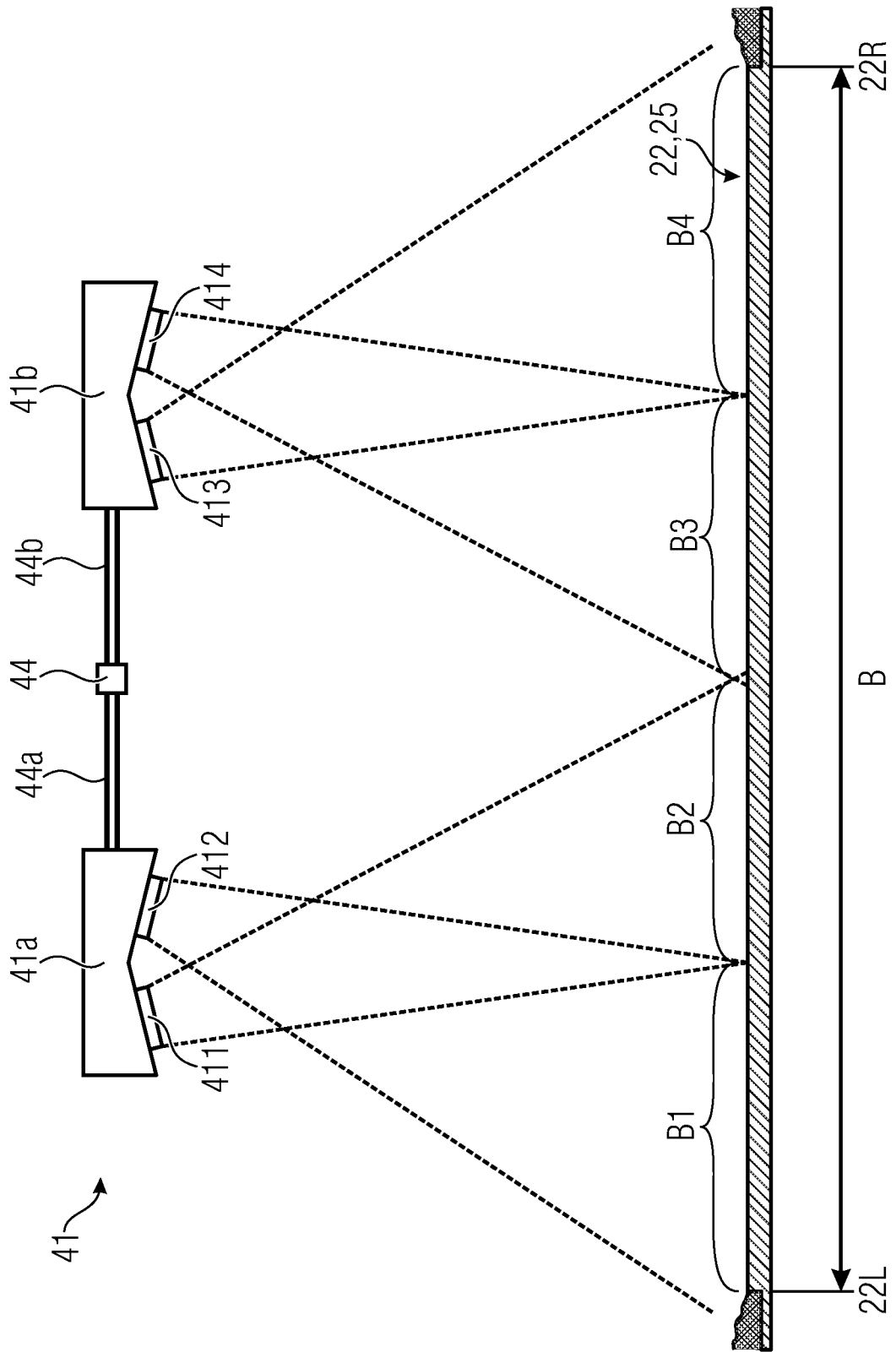

FIGS. 3c and 3d show the temperature measuring device 41 split up into two individual temperature measuring devices 41a and 41b which are connected at a distance, advantageously in a fixed and immobile manner, to the carrier 44 via carrier mechanics 44a and 44b. The individual temperature measuring devices 41a and 41b may be spaced apart from each other by a distance of approx. 2.50 m, which roughly corresponds to the width of the operator's cab, to the vehicle width, and/or to the width of basic screed. Each of the two temperature measuring devices 41a and 41b includes two individual temperature sensors 411 and 412 as well as 413 and 414, which are directed to the surface of the newly installed (asphalted) road pavement 22. Each of the individual temperature sensors 411, 412, 413, and 414 senses, when viewed in the direction transverse to the direction of travel F of the road finisher 10, a subarea B1, B2, B3, and B4 of the overall installation width B, which subareas B1, B2, B3, and B4 added together yield the overall installation width B. The individual temperature sensors 411 and 412 as well as 413 and 414 are each arranged at a mutual angle, such that the subareas B1, B2, B3, and B4 to be sensed will slightly overlap, so that there will be no area between the subareas B1, B2, B3, and B4 that is not sensed, if possible. The temperature sensors 411 and 412 as well as 413 and 414 are arranged to be mutually twisted, e.g., at an angle of approx. 220° (FIG. 3c, generally within a range between 180° and 270°) and approx. 140° (FIG. 3d, generally within a range between 90° and 180°), respectively (on this note, see also the schematic representations in FIGS. 3g and 3h as well as their descriptions further below); depending on the mounting height of the temperature measuring device 41 above the surface of the newly installed (asphalted) road pavement 22 at the road finisher 10, and/or depending on the mutual distances between the individual temperature sensors 411 and 412 as well as 413 and 414, the angles exhibited by the temperature sensors 411 and 412 as well as 413 and 414 in relation to one another may also deviate, or differ. One may well see in FIG. 3c that the sensing areas of the temperature sensors 412 and 413 overlap, so that the temperature sensor 412 also senses part of the area B3 and that the temperature sensor 413 also senses part of the area B2. By analogy, one can see in FIG. 3d that the sensing areas of the temperature sensors 411 and 414 overlap, so that the temperature sensor 411 also senses part of the area B3 and that the temperature sensor 414 also senses part of the area B2. In addition, one can see in FIGS. 3c and 3d that in addition to the outer subareas B1 and B4, those road edge areas that go beyond the edge areas (edges) 22L and 22R of the newly installed (asphalted) road pavement 22 are also sensed. This shows that with the embodiments of FIGS. 3c and 3d, the overall installation width B that may be sensed may be clearly wider than with the embodiments of FIGS. 3a and 3b. The mutual distances of the individual temperature measuring devices 41a and 41b therefore might be increased even more so as to increase the overall installation width B that may be sensed. Moreover, this shows that it is also possible, with these embodiments, to calculate the overall installation width, especially on the basis of the temperature profile sensed. Since those road edge areas that go beyond the edge areas (edges) 22L and 22R of the newly installed (asphalted) road pavement 22 exhibit a temperature that is considerably cooler than that of the newly applied asphalt 22, the edge areas (edges) 22L and 22R may be accurately sensed, so that the process calculator unit and/or evaluating means 43 would be capable of calculating an overall installation width B on the basis of the temperature profile.

FIGS. 3e to 3h show what is meant by, or what is to be understood by, "arranged at a mutual angle" with regard to the individual temperature sensors 411, 412, 413, and 414. For simplicity's sake, FIGS. 3e to 3h show only sections of the temperature measuring devices 41 and 41a/b known from FIGS. 3a to 3d, respectively.

Figure 3E:
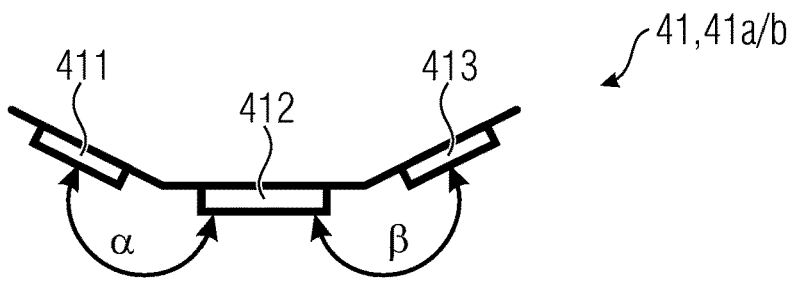
Figure 3F:
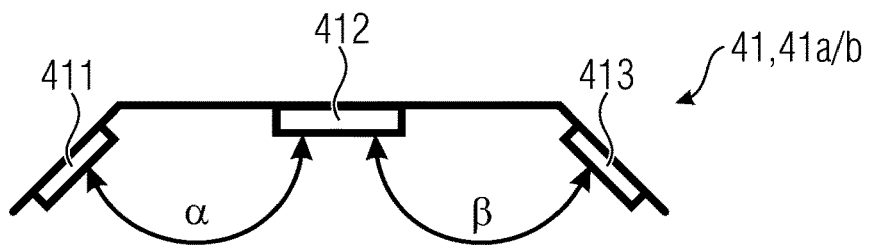

FIGS. 3e and 3f show how the temperature sensors 411 and 412 are mutually arranged at an angle α and how the temperature sensors 412 and 413 are mutually arranged at an angle β, namely—as was already described above with regard to FIGS. 3a and 3b—at an angle α/β of, e.g., approx. 220° (FIG. 3e, generally within a range between 180° and 270°) and approx. 140° (FIG. 3f, generally within a range between 90° and 180°). Angles α and β may be identical or different from each other. Depending on the mounting height of the temperature measuring device 41 above the surface of the newly installed (asphalted) road pavement 22 at the road finisher 10, and/or depending on the mutual distances between the individual temperature sensors 411, 412, and 413, the angles α and β exhibited by the temperature sensors 411, 412, and 413 in relation to one another may also deviate, or differ.

Figure 3G:
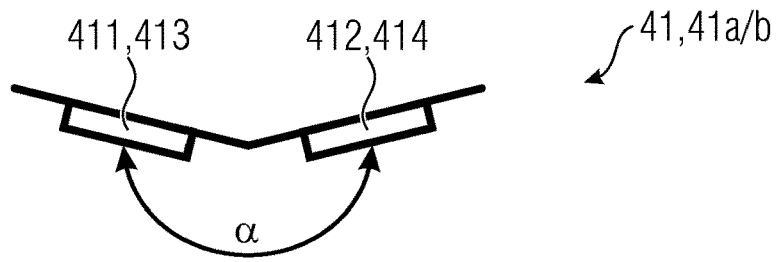
Figure 3H:
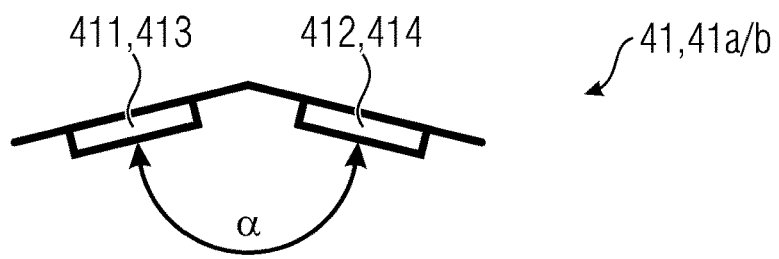

FIGS. 3g and 3h further show how the temperature sensors 411 and 412 as well as 413 and 414 are mutually arranged at an angle α, namely—as was already described above with regard to FIGS. 3c and 3d—at an angle α of, e.g., approx. 220° (generally within a range between 180° and 270°) and approx. 140° (FIG. 3h, generally within a range between 90° and 180°). Depending on the mounting height of the temperature measuring devices 41 and 41a/b above the surface of the newly installed (asphalted) road pavement 22 at the road finisher 10, and/or depending on the mutual distances between the individual temperature sensors 411 and 412 as well as 413 and 414 (distance between the temperature measuring devices 41 and 41a/b), the angle α exhibited by the temperature sensors 411 and 412 as well as 413 and 414 in relation to one another may also deviate, or differ.

Advantageously, the temperature sensors 411, 412, 413, and 414 are so-called thermopile arrays, or pyrometer arrays, since they contain no mechanically mobile parts. This is advantageous, for example, with regard to robustness and a long service life of the entire temperature measuring device 41 when used in the field of road construction. Each of the above-described temperature sensors 411, 412, 413, and 414 has an aperture angle, or viewing angle, of approx. 40°, schematically depicted in the figures and/or indicated by dashed lines, which are depicted to progress from the respective temperature sensor 411, 412, 413, or 414 toward the surface of the newly installed (asphalted) road pavement 22. However, one may also use temperature sensors having smaller or larger aperture angles or viewing angles as well as other types and implementations of temperature sensors, for example one or more thermal-imaging cameras or the like.

If the temperature measuring device 41 is arranged at the road finisher 10 at, for example, a height of approx. 3.80 m above the surface of the newly installed (asphalted) road pavement 22, the above-described embodiments in accordance with FIGS. 3a and 3b and an aperture angle, or viewing angle, as indicated above, of the individual temperature sensors 411 to 414 of approx. 40° result in a capturable installation width B of approx. 13 m. Within this context, a width of approx. 5.15 m, capturable by the temperature sensors 411 and 413, results for the outer subareas B1 and B3, and a width of approx. 2.72 m, capturable by the temperature sensor 412, results for the medium subarea B2, so that in total, the abovementioned capturable overall installation width B that results is approx. 13 m. With the above-described embodiments in accordance with FIGS. 3c and 3d, the capturable total installation width B might be clearly larger, so that even with large installation widths (for example in motorway construction), the entire roadway width might be captured by using one single temperature measuring device 41. This may be achieved, e.g., by increasing the distance between the individual temperature measuring devices 41a and 41b or by arranging the individual temperature measuring devices 41a and 41b in a mutually twisted manner, such that the aperture angles, or viewing angles, of the individual temperature sensors 411 to 414 point, or are directed, further outward toward the road edge areas. The measuring areas of the temperature measuring devices are thereby increased.

As depicted in FIGS. 3c and 3d, respectively, the two sensors of the array, such as the sensors 411 and 412, and 413 and 414, respectively, may overlap. This means that in the overlap area (e.g., at the transition between B1 and B2 and/or at the transition between B3 and B4), both sensors 411 and 412, and 413 and 414, respectively, have one and the same measuring point in their measuring fields. This enables the two sensors to validate each other. Even though a difference in temperature that is measured here at this point obviously focuses on the same measuring point, or a measuring point that is very close by, it will most probably not reflect reality but may be traced back to different temperature measuring properties. Said comparison and adjustment enables mutually validating and/or correcting the two temperature sensors 411 and 412, and 413 and 414, respectively.

Figure 3J:
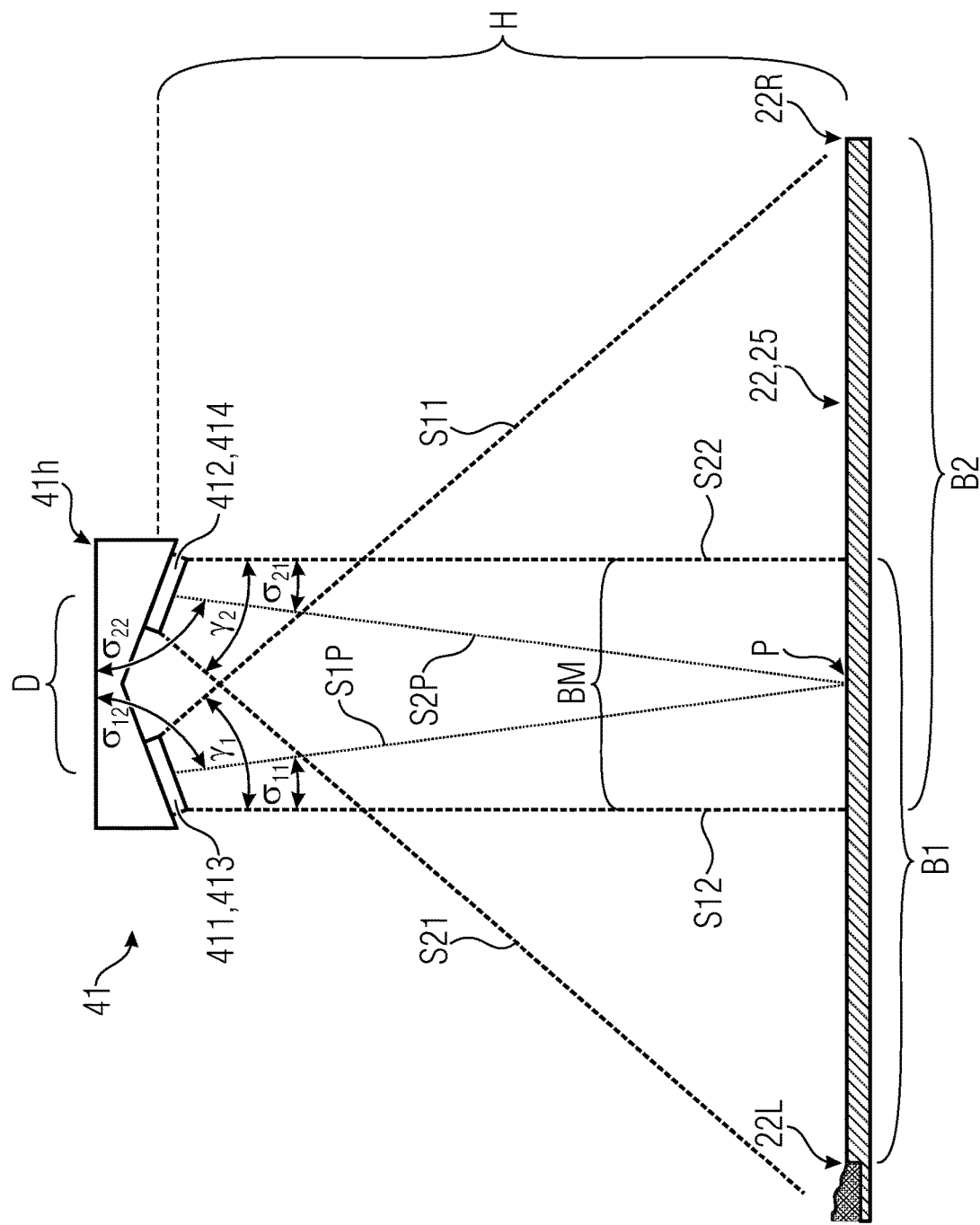

Further embodiments of the temperature measuring device are schematically depicted in FIGS. 3i and 3j. Here, the temperature measuring device 41 includes two individual temperature sensors 411 and 412, and 413 and 414, respectively (similar to the temperature measuring devices 41a and 41b, respectively, shown in FIG. 3d; on this note, see also FIG. 3h), which are directed to the surface of the newly installed (asphalted) road pavement 22. Each of the temperature sensors senses, in a direction transverse to the direction of travel, or of movement, F,10B, of the road finisher 10, a subarea B1 and/or B2 of the overall installation width demarcated by the road edge areas 22L and 22R. In this context, the captured area of the temperature sensor 412 and/or 414, as depicted in FIGS. 3i and 3j, respectively, goes beyond the road edge area 22L, i.e. in addition to the subarea B1, the road edge area is also captured. However, it is understood that this may also apply to the captured subarea B2 of the temperature sensor 411 and/or 413, i.e. that the captured area B2 of the temperature sensor 411 and/or 413 may go beyond the road edge area 22R, which is formed by an asphalt edge in FIGS. 3i and 3j.

In the embodiments of FIGS. 3i and 3j, the individual temperature sensors are arranged at a mutual angle α (see also FIG. 3h), $\gamma_1$ and $\gamma_2$ representing the aperture angles of the corresponding temperature sensors when viewed in the direction transverse to the direction of travel and/or movement F,10B of the road finisher 10. The aperture angle γ, or the aperture angles $\gamma_1$ and $\gamma_2$, of the temperature sensors when viewed in the direction transverse to the direction of travel and/or movement F of the road finisher 10 is/are indicated and, thus, defined by radiation lines S11, S12, S21, and S22. The aperture angles $\gamma_1$ and $\gamma_2$ may be identical or different, depending on the implementation of the temperature measuring device. The subareas B1 and B2 to be sensed overlap, so that the temperature sensor 411 and/or 413 senses not only the subarea B2, but also a part of the area B1, and so that the temperature sensor 412 and/or 414 senses not only the subarea B1, but also part of the area B2.

What is particular about the embodiment depicted in FIG. 3i is that the subareas B1 and B2 to be captured overlap in such a manner that irrespectively of an installation or mounting height H and/or of the distance of the temperature measuring device 41 from the surface of the newly installed (asphalted) road pavement 22, the overlapping subarea BM is identical in terms of its width when viewed in the direction transverse to the direction of travel and/or movement F,10B of the road finisher 10. In other words, alignment of the arrays to an overlapping area BM of the measuring fields occurs such that upon a change in the distance of the temperature measuring device 41 from the reference surface 22, the overlapping area BM of the measuring fields, which is captured by the arrays (temperature sensors), maintains the same width when viewed in the direction transverse to the direction of travel and/or movement F,10B of the construction machine 10. The reason for this is that the radiation lines S12 (of the temperature sensor 411 and/or 413) and S22 (of the temperature sensor 412 and/or 414) extend in parallel with each other and are perpendicular on the surface of the newly installed (asphalted) road pavement 22, i.e. at an angle φ of 90°. This is mostly not the case in other embodiments since sensing areas either do not overlap or since a width of the overlapping measuring field will also change upon a change in the mounting height and/or in the distance of the temperature measuring device 41 from the surface of the newly installed (asphalted) road pavement 22 since the radiation lines of the temperature sensors do not extend in parallel with each other and are therefore not perpendicular on the surface of the newly installed (asphalted) road pavement 22, i.e. at an angle φ that is different from 90°. Also, in other embodiments, overlapping areas might suddenly no longer overlap upon a change in the mounting height and/or in the distance of the temperature measuring device 41 from the surface of the newly installed (asphalted) road pavement 22.

However, this is avoided by the embodiment in accordance with FIG. 3i, which is advantageous with regard to validation of the temperature sensors. Since by the embodiment of FIG. 3i, what is captured by the temperature sensors is a subarea BM, and, thus, a measuring field, that is the same in width (when viewed in the direction transverse to the direction of travel and/or movement F,10B of the road finisher 10). As was already explained with regard to the embodiments of FIGS. 3c and 3d, respectively, within the context of validation of temperature measuring values, both sensors 411 and 412, and 413 and 414, respectively, have one and the same measuring point in their measuring fields in the overlap area BM. This allows mutual validation of the two sensors. For here, too, even though a difference in temperature that is measured here at this point obviously focuses on the same measuring point, or a measuring point that is very close by, it will most probably not reflect reality but may be traced back to different temperature measuring properties. Said comparison and adjustment enables mutually validating and/or correcting the two temperature sensors 411 and 412, and 413 and 414, respectively, namely irrespectively of the mounting height and/or of the distance of the temperature measuring device 41 from the surface of the newly installed (asphalted) road pavement 22.

In the embodiment of FIG. 3i, the individual temperature sensors are mutually arranged at an angle $\alpha=180°-(\gamma_1/2+\gamma_2/2)$. With an aperture angle, or sensing angle $\gamma_1=\gamma_2=\gamma$ (both temperature sensors have the same aperture angle, or sensing angle) of, e.g., 40.8° when viewed in the direction transverse to the direction of travel and/or movement F,10B of the road finisher 10, an angle $\alpha=180°-(20.4°+20.4°)=180°-40.8°=132.2°$ results.

What is particular about the embodiment depicted in FIG. 3j is that the temperature measuring device 41 may itself determine the installation or mounting height H. This is advantageous in several respects. On the one hand, the installation or mounting height H is currently determined manually, i.e. the installation or mounting height H is initially measured by operating staff and is subsequently input into the measurement system, so that these types of work may advantageously be dispensed with and so that the operating staff has more time to deal with other types of work concerning the road building process. Measuring the installation or mounting height H on the part of the operating staff is difficult also because the mounting location of the temperature measuring device 41 is typically difficult to reach for the operating staff. On the other hand, determination of the installation or mounting height H performed by the temperature measuring device 41 itself is advantageous in terms of accurate determination and/or calculation of the speed (of travel), for example if the layer thickness of the newly installed (asphalted) road pavement 22 changes during installation. As will be described further below, for determining the speed (of travel) of the road finisher 10, it is useful to convert the captured temperature images to a uniform raster. I.e., to be able to convert shifting of the pixels from one temperature image to another to a value of meters per minute, it is useful to transfer projection of the pixels on the surface of the newly installed (asphalted) road pavement 22 to a uniform raster so that a speed (of travel) of the road finisher 10 may be calculated. For this purpose, what is needed is as precise a distance as possible of the temperature measuring device 41 to the surface of the newly installed (asphalted) road pavement 22. If the temperature measuring device 41 is arranged, for example, at the roof of the road finisher or at the booms of the roof or at any other place of the road finisher chassis, any change in the layer thickness will also result in a change in the distance (and, therefore, also in the installation or mounting height H) of the temperature measuring device 41 to the surface of the newly installed (asphalted) road pavement 22. However, an installation or mounting height H that is fixedly stored in the measurement system, e.g. is specified by means of manual input, will then deviate from an actual installation or mounting height H, so that determination and/or calculation of the speed (of travel) becomes inaccurate or erroneous. Advantageously, the installation or mounting height H is determined continuously or at least at regular intervals by the temperature measuring device 41.

Determining of the installation or mounting height H by the temperature measuring device 41 is effected as follows:

Initially, the overlapping subarea BM is determined, with regard to width and length (transverse to and in the direction of travel of the machine), from the areas B1 and B2 captured by the temperature sensors 411 and 412, and 413 and 414, respectively. The point P located at the center of the overlapping subarea BM, i.e. viewed centrally in the x and y directions of the area BM, is used for further calculation, i.e. the pixel coordinates of this point are used for the further calculations. It shall be noted that the point P may also represent an area located inside the overlapping area BM, wherein there is heat distribution at different temperatures. Within this context, the point P represents a reference within the overlapping area BM.

The position at which the point P is located both in the subarea BM and in any of the areas B1 and B2 may be used as the basis for determining the angles $\sigma_{11}$ and $\sigma_{21}$, i.e. the angles between the radiation lines S1P and S2P, respectively, that are drawn in in FIG. 3j (between the individual temperature sensors and the point P) and the (horizontal) upper surface 41h of the temperature measuring device 41. To this end, each of the two temperature images representing the areas B1 and B2 is analyzed, specifically such that the pixel coordinates in the temperature image are evaluated. From the position of the point P to the corresponding edge of the image which demarcates the area BM, and the overall width B1 and/or B2 as well as the aperture angle $\gamma_1$ and/or $\gamma_2$ of the respective temperature sensor, the angles $\sigma_{11}$ und $\sigma_{21}$ may be calculated.

The angles $\sigma_{12}$ und $\sigma_{22}$ may now be calculated from the angles $\sigma_{11}$ und $\sigma_{21}$; here, one has to consider essentially two cases. For the case of FIG. 3i, wherein the radiation lines S12 (of the temperature sensor 411 and/or 413) and S22 (of the temperature sensor 412 and/or 414) extend in parallel with each other and are located perpendicularly on the surface of the newly installed (asphalted) road pavement 22 (angle $\varphi=90°$), the angles $\sigma_{12}=90°-\sigma_{11}$ und $\sigma_{22}=90°-\sigma_{21}$ will result. In case the angles $\varphi$ differ from 90° (the radiation lines S12 and S22 are not perpendicular on the surface of the newly installed (asphalted) road pavement 22), the angle $\alpha$, i.e. the indication regarding the angle at which the individual temperature sensors are arranged with respect to one another, and the aperture angles of the temperature sensors $\gamma_1$ and $\gamma_2$ will have to be taken into account. For the angles, this will result in $\sigma_{12}=(\alpha/2+\gamma_1/2)-\sigma_{11}$ und $\sigma_{22}=(\alpha/2+\gamma_2/2)-\sigma_{21}$.

By means of the angles $\sigma_{12}$ und $\sigma_{22}$ as well as of the distance D between the temperature sensors, which results from the mechanical design of the temperature measuring device 41 and may advantageously be stored in the measurement system as a fixed value, the installation or mounting height H of the temperature measuring device 41 will be calculated as follows:

$$H = D \cdot \left( \frac{\sin(\sigma_{12}) \cdot \sin(\sigma_{22})}{\sin(180° - \sigma_{12} - \sigma_{22})} \right)$$

Alternatively to determining the installation or mounting height H by the temperature measuring device 41, one may also use an additional distance sensor (not depicted in the figures), e.g. a radar sensor, ultrasound sensor, or laser distance sensor, which is arranged at the temperature measuring device 41 or at the carrier 44 and measures the distance to the surface of the newly installed (asphalted) road pavement 22.

With regard to determining the position, as was described above, of the point P located at the center of the overlapping subarea BM as well as to the subsequent calculations of the installation or mounting height H, it may further be advantageous if it is possible to measure an inclination of the temperature measuring device 41 since the temperature measuring device 41 may not always be mounted perpendicularly at the road finisher 10 for reasons related to mounting. In other words, the temperature measuring device 41 mostly has an inclination, due to reasons related to mounting, which should be taken into account for accurate calculation of the installation or mounting height H. This inclination may be either previously measured by the operating staff and be input into the measurement system, or the inclination is captured by an inclination sensor arranged at or inside the housing of the temperature measuring device 41, in which case the inclination sensor will then be electrically connected to the processing unit 410 and/or to the process calculator unit and/or evaluating means 43, which may receive the inclination sensor signals and evaluate them accordingly, i.e. the inclination sensor signals are then taken into account in, or considered in the calculation of, the above-described temperature image analysis and/or temperature image evaluation as well as in the subsequent calculations for the installation or mounting height H. Advantageously, a uniaxial or biaxial inclination sensor is used for measuring the longitudinal inclination and/or transverse inclination of the temperature measuring device 41. In addition to the inclination of the temperature measuring device 41, the inclination of the road finisher (chassis) may be measured since said road finisher (chassis) will also incline depending on the properties of the foundation which is to be asphalted and on which the road finisher 10 is moving during installation, which will thus have an influence on determining the position, as described above, of the point P located at the center of the overlapping subarea BM as well as on the subsequent calculations of the installation or mounting height H. The inclination of the road finisher 10 during installation may be captured by means of an inclination sensor arranged at the road finisher (chassis), in which case the inclination sensor may be electrically connected to the processing unit 410 and/or to the process calculator unit and/or evaluation means 43, which may receive the inclination sensor signals and evaluate them accordingly. For example, a measured inclination of the temperature measuring device 41 may be corrected by means of said inclination sensor signals since said inclination will consequently change as the inclination of the road finisher (chassis) changes.

Figure 4:
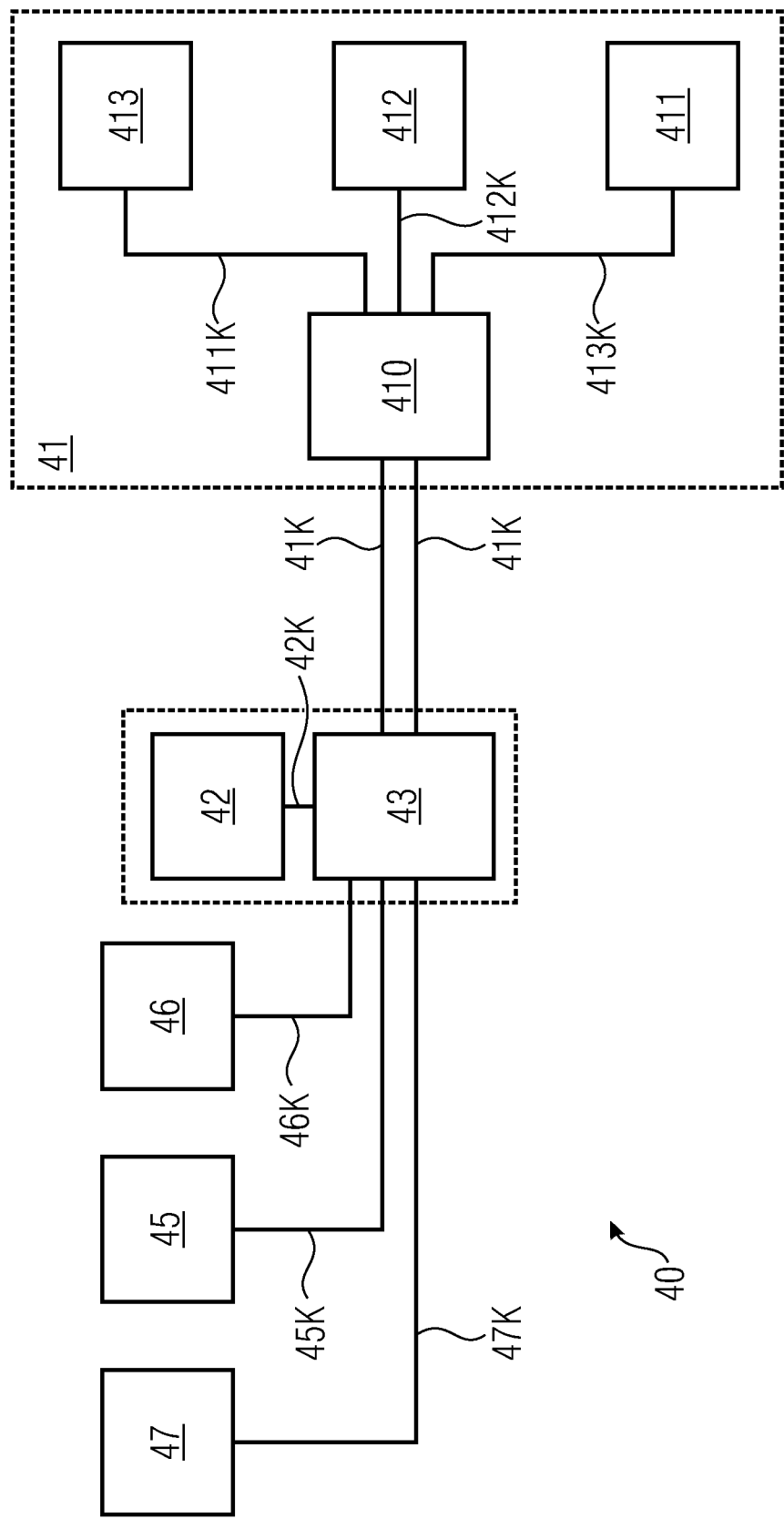
FIG. 4 shows a schematic block diagram of the measurement system in accordance with extended embodiments.

FIG. 4 schematically depicts the temperature sensing system 40. The temperature measuring device 41 includes (as was already shown in FIGS. 3*a* and 3*b*) three individual temperature sensors 411, 412, and 413, which are electrically connected to a processing unit 410 via cable connections 411K, 412K and 413K. However, it is also feasible here for the temperature measuring device 41 to include (one or more) further temperature sensors (as shown in FIG. 3*c* or 3*d*, for example), which are then also electrically connected, accordingly, to the processing unit 410. However, it is also feasible here for the temperature measuring device 41 to include only one or two temperature sensors. The processing unit 410 essentially processes the data which is measured by the temperature sensors 411, 412, and 413 (and possibly further temperature sensors) and which is then transmitted to the process calculator unit/evaluation means 43 via one or more cable connections 41K for further evaluation. In addition, the processing unit 410 serves, e.g., to configure the individual temperature sensors and to start the measurements.

Within this context, it is also feasible for temperature image analyses and/or temperature image evaluations as well as calculations to be performed within the temperature measuring device 41 itself, in particular within the processing unit 410, e.g. the calculations described with regard to FIGS. 3*i* and 3*j*.

As was already described above, it is also feasible for the process calculator unit/evaluation means 43 or at least a part thereof to be integrated in the temperature measuring device 41, in particular in the processing unit 410, so as, e.g., to analyze temperature images or to perform temperature image evaluation or to perform calculations such as the calculations described with regard to FIGS. 3*i* and 3*j*.

As was already described above, the process calculator unit and/or evaluation means 43 is electrically connected to the display and operating device 42 via a cable connection 42K, which also serves as a so-called man/machine interface (MMI). For example, the measured temperature data is indicated to an operator, e.g. the screed staff, by means of the display and operating device 42 in the form of a colored curve by means of which the profile of the measured temperatures across the entire installation width B may be monitored during installation. The process calculator unit/ evaluation unit 43 furthermore also has the already described components 45 (communication device), 46 (weather station), and 47 (positioning means) electrically connected to it via corresponding cable connections 45K, 46K and 47K so as to receive—as was already described above—e.g. positional data by means of the positioning means 47 and to display said data on the display and operating device 42 or to link measured temperature data to positional data so as to store said data in the process calculator unit and/or evaluation means 43.

Figure 5:
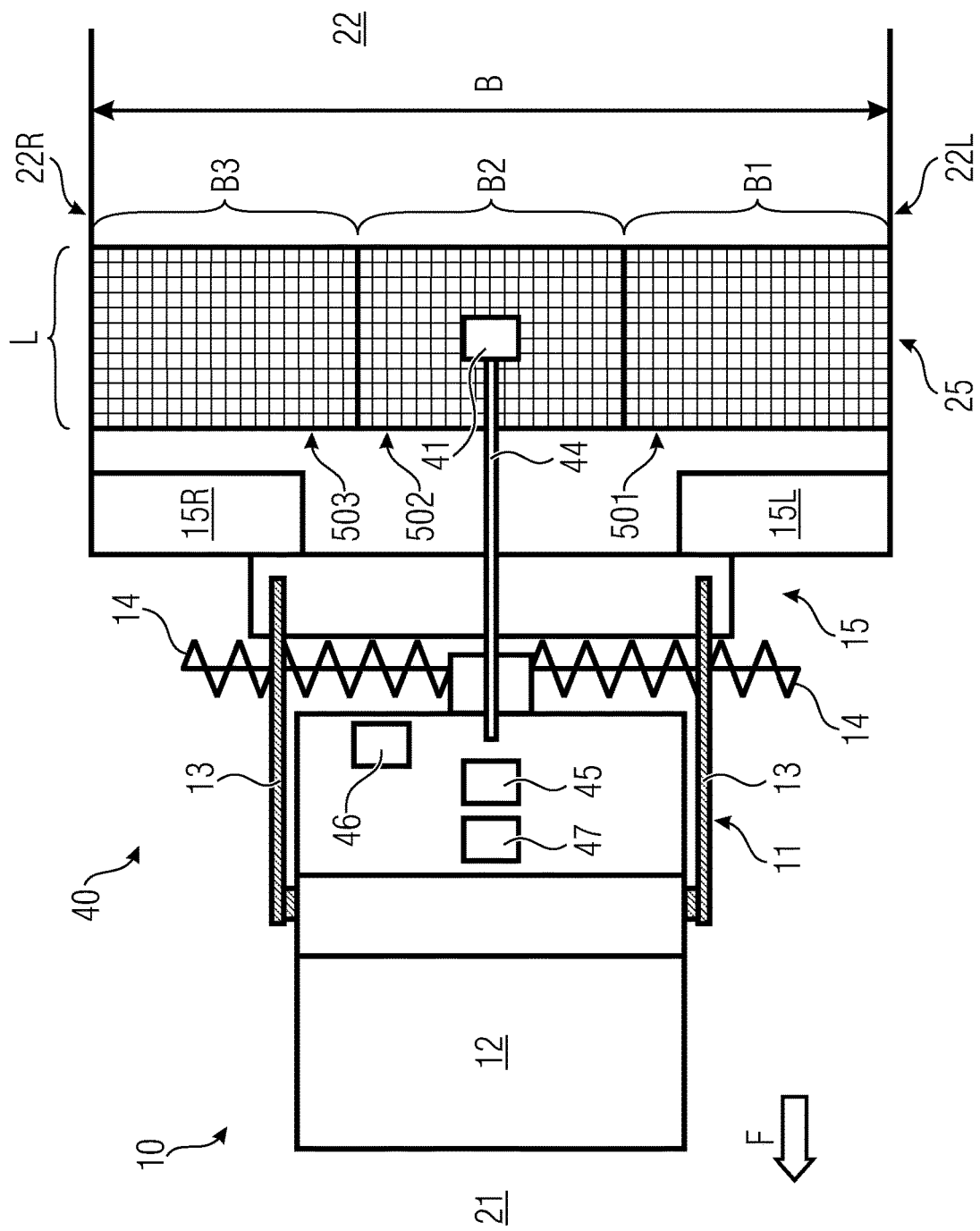
FIG. 5 shows a schematic representation of a road finisher comprising a measurement system in accordance with extended embodiments.

FIG. 5 schematically shows a top view of the self-driving road finisher 10 already depicted in FIG. 2*b*, i.e. shows it as viewed from above. The sensing area 25, which, when viewed in the direction transverse to the direction of travel F of the road finisher 10 or when viewed across the entire installation width B as well as in the direction of travel F of the road finisher 10, extends across a length L, is depicted as being split up into three individual areas 501, 502 and 503. The three sensing areas are associated accordingly with the three temperature sensors 411, 412 and 413 which were described above and are shown in FIGS. 3*a*, 3*b* and 4, i.e. on the newly installed road pavement 22, the temperature sensor 411 senses the temperatures in the area 501, the temperature sensor 412 senses the temperatures in the area 502, and the temperature sensor 413 senses the temperatures in the area 503. The three sensing areas 501, 502 and 503 are schematically subdivided into a raster which is to show that the temperature sensors 411, 412 and 413 comprise a pixel matrix, as is also the case, e.g., in thermopile arrays or pyrometer arrays. The three individual temperature sensors 411, 412 and 413 may comprise, e.g., a pixel matrix of 80×64 pixels in each case, i.e. 80 pixels when viewed in the direction transverse to the direction of travel F of the road finisher 10, and 64 pixels when viewed in the direction of travel F of the road finisher 10, across a length L, so that the sensing area 25 (surface area B×L) is scanned with a total of 240×64 pixels. Such temperature sensors (thermopile arrays) that are available in the market comprise an aperture angle, or sensing angle, of, e.g., approx. 40.8°×32.8°, i.e. 40.8° when viewed in the direction transverse to the direction of travel F of the road finisher 10, and 32.8° when viewed in the direction of travel F of the road finisher 10, so that, as was already described above with reference to FIGS. 3*a* to 3*c*, in the event of a mounting height of the temperature measuring device 41 of, e.g., 3.80 m above the surface of the newly installed (asphalted) road pavement 22, a capturable installation width B of approximately 13 m results. What is also conceivable in this connection are other matrix resolutions (e.g. 120×84 pixels) as well as other aperture angles, or sensing angels. It would also be possible to capture a largely distortion-free thermal image by means of optics placed at the temperature sensor 411, 412 and/or 413. Also, a corresponding coating of the optics and/or of the lens would be feasible which causes the temperature sensor to absorb heat radiation only.

Figure 6A:
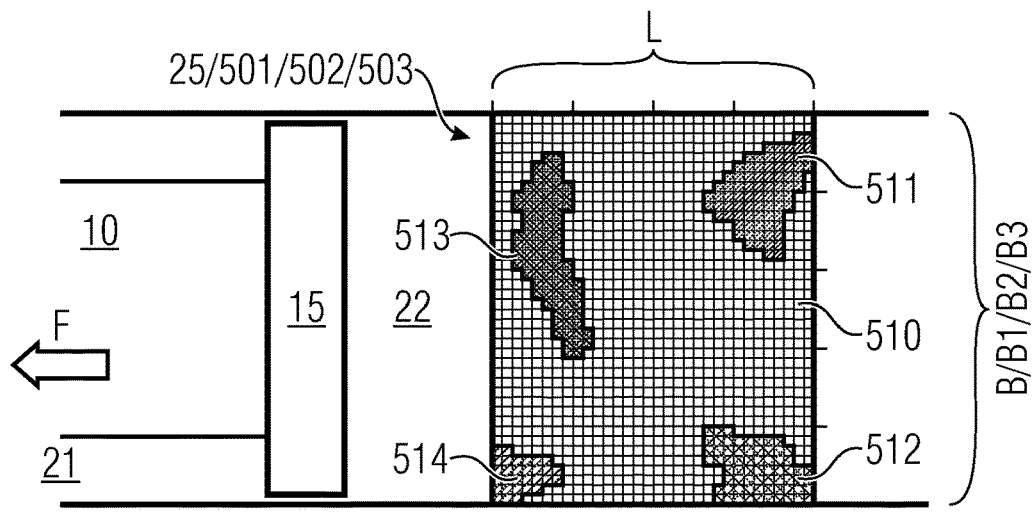
FIGS. 6a-c show schematic representations for illustrating shifting of temperature zones upon shifting of the measuring field in accordance with embodiments.
Figure 6B:
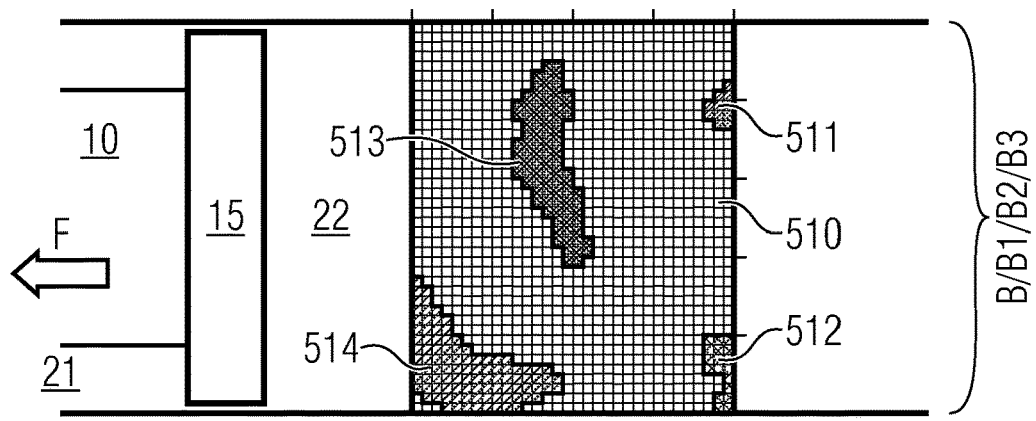
Figure 6C:
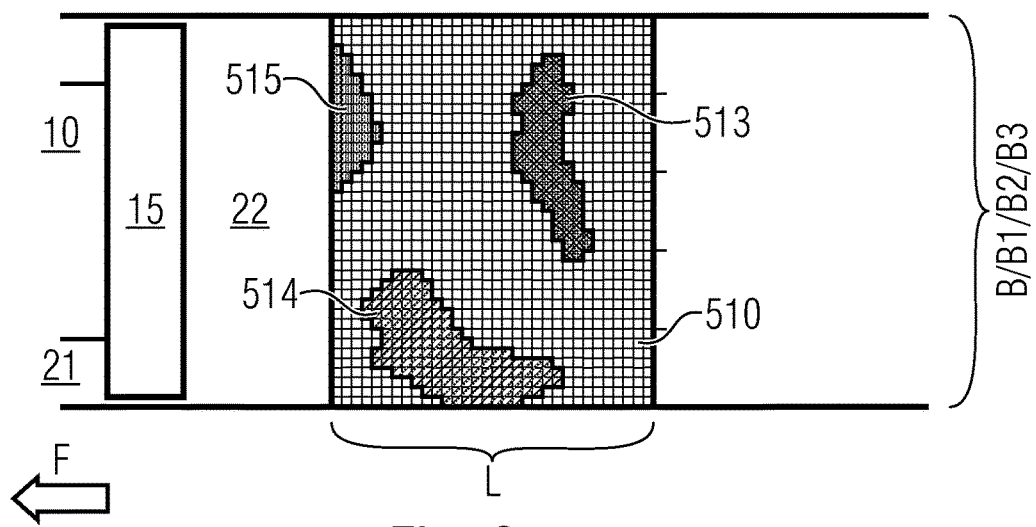

FIGS. 6*a* to 6*c* schematically show a top view of a self-driving road finisher 10 comprising a screed 15. In a simplified representation, the figures show one of the three sensing areas 501, 502 and 503 and/or the sensing area 25 itself, specifically as a pixel matrix having a resolution of 32×40 pixels, i.e. 32 pixels when viewed in the direction of travel F of the road finisher 10, and 40 pixels when viewed in a direction transverse to the direction of travel F of the road finisher 10, across a length L. During material installation, the road finisher 10 moves in the direction of travel F on a surface of the foundation 21 to be asphalted. The three sensing areas 501, 502 or 503 and/or the sensing area 25 also move at the same speed as does the road finisher 10. This means that the temperature measuring device 41 and, therefore, also the sensing areas "migrate", during material installation, in the direction of travel F of the road finisher 10 at the same speed as the latter, the temperature measuring device 41 (not shown in FIG. 6) continuously measuring, or sensing, temperature values of the surface of the newly installed (asphalted) road pavement 22.

As depicted in FIGS. 6*a* to 6*c*, the temperature images measured consist of different temperature areas 510 to 515; for simplicity's sake, the temperature images depicted each have mutual offsets of 8 pixels in the direction of travel F of the road finisher 10. The different temperature areas 510 to 515 comprise mutually different temperatures. On the basis of the temperature area 510, which has an asphalt temperature of, e.g., 160° C., the other temperature areas 511 to 515 may have larger or smaller temperature differences thereto, for example a difference within the range of +/−2° C., +/−5° C., or larger. The areas 510 to 515 shown by way of example thus show a temperature profile when viewed in a direction transverse to the direction of travel F of the road finisher 10 and in the direction of travel F of the road finisher 10. This temperature profile, which is continuously captured during material installation and furthermore is continuously transmitted from the temperature measuring device 41 to the process calculator unit and/or evaluation means 43, may then be used as the basis for calculating, on the part of the process calculator unit and/or evaluation means 43, a speed (of travel) of the road finisher 10 as well as a distance covered by comparing the data captured. Moreover, the process calculator unit and/or evaluation means 43 may determine, or detect, "halting" and "starting-up" of the road finisher 10 by comparing the data captured. Determining the speed (of travel) is possible since by means of the thermopile arrays, or pyrometer arrays used, several lines may be captured and since, thus, two data captured one after the other may be compared to each other. By means of the time difference, a speed of the road finisher 10 as well as the further movement parameters may then be determined.

A speed (of travel) of the road finisher 10 may be calculated, for example, by the method of the optical flow, which describes, for each picture element in an image of a sequence of images, the position thereof in the subsequent image of the image sequence (by means of changes in the brightness between individual picture elements). This method is based on the Horn-Schunck method, an algorithm developed by Berthold K. P. Horn and Brian G. Schunck for determining movement information from a sequence of images. The Horn-Schunck method may also be used for determining movement and speed information from temperature images. For calculating the speed, the algorithm provides a shift, which is based on a heat change, in the x and y directions, i.e. when viewed in the direction of travel F of the road finisher 10 as well as in the direction transverse to the direction of travel F of the road finisher 10. In the present case, utilization of the method of the optical flow means a change in temperature values in the individual temperature images. In order to be able to convert the direction (of travel) of the road finisher 10 from the shift in pixels from one temperature image to another to meters per second, it is useful to convert the images to a uniform raster. With said uniform raster, one may infer the distance covered and may determine, via the time difference of the consecutive temperature images, the speed (of travel) of the road finisher 10 in meters per second. This may also be used as the basis for establishing whether or not the road finisher 10 is moving, i.e. for determining or detecting "halting" and "starting-up" of the road finisher 10.

In this context, it would also be feasible for the process calculator unit and/or evaluation means 43 to use positional data of the machine 10 (from the positioning means 47, e.g. GNSS/GPS 60) so as to correct, e.g. at predetermined intervals, the distance covered which was calculated from the temperature images.

Figure 7:
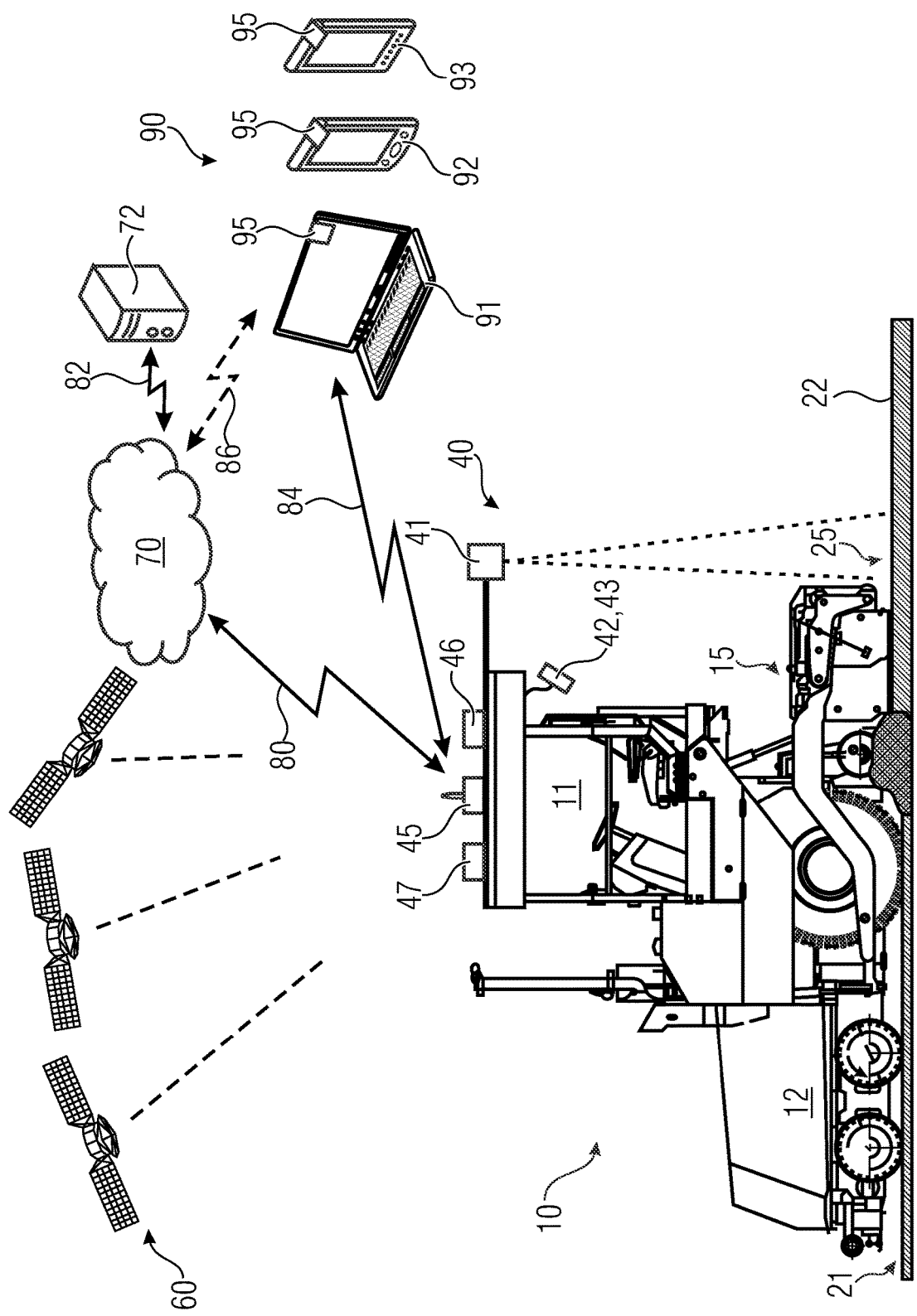
FIG. 7 shows a schematic representation of the measurement system in interaction with further components of the road construction machine in accordance with embodiments.

FIG. 7 schematically shows the self-driving road finisher 10 comprising the temperature sensing system 40 already described. Via the communication device 45, the temperature sensing system 40 arranged at the road finisher 10 is capable of exchanging data with a remotely located data server 72 and/or a mobile terminal 90 in a wireless manner, i.e. to wirelessly transmit data to the devices 72 and 90 mentioned as well as to wirelessly receive data from said devices 72 and 90. For example, the mobile device 90 may be a laptop computer 91 or a smartphone 92 or a tablet PC 93 or the like, the mobile device 90 comprising a communication device 95 so as to be able to communicate via corresponding wireless types of connection such as WLAN, Bluetooth, etc.

For example, data such as measured temperature values and/or data indicating the position of the machine 10 may be sent, via a connection 80 or 84, to the mobile device 90 or may be sent to the data server 72 view a network 70 for logging, calculating or evaluation purposes. As a result, a machine operator or construction site manager will at any time have an overview of the installation process and will be able to immediately react in case of problems arising, such as a measured temperature which is outside a defined range. Also, a construction site manager positioned at a distance may recognize whether the installation process is continuous and is effected at a roughly constant installation speed or whether there is the occasional "halting" and "starting-up" of the finisher 10. Moreover, data may be sent from the mobile device 90 also to the temperature sensing system 40 located at the road finisher 10 or to the data server 72 via the connection 80, 82, 84 and/or 86, so as to set, e.g., calculating parameters of the calculating algorithm or to store data relating to the temperature sensing system 40 on the data server 72. It is also feasible in this context for calculations of the temperature sensing system 40 to be performed, during asphalt installation, not (only) in the process calculator unit and/or evaluation means 43, but (also) on the data server 72, for which case a continuously existing data and/or communication connection between the process calculator unit and/or evaluation means 43 located on the road finisher 10 and the data server 72 is a prerequisite. Also for the purposes of remote servicing, the communication device 45, the communication connections 80, 82, 84, and 86 as well as the mobile devices 90 are suited to poll, e.g., a status of the temperature sensing system 40 and/or to detect and correct an error that may arise in the temperature sensing system 40 from a distance.

With regard to the embodiment of FIG. 2, it shall be noted that here it shall be assumed that the temperature measuring device 41 comprises a measuring field, or a measuring area 25 of the temperature measuring device 41 which is located behind the screed 15. In accordance with further embodiments, alternatively or additionally, one or more temperature measuring devices may be provided which is/are directed to the area in front of the screed, in particular to the area in front of the road finisher, or to the areas on the side of the road finisher or of the screed.

In the embodiments, it is assumed that the evaluation device determines a movement parameter. A possible movement parameter is the direction of movement, e.g. along the movement axis 10B. However, the road finisher is also configured to move perpendicularly to the direction of movement 10B, i.e. by being steered. This is important in terms of having the road finisher follow the desired course of the road. A further movement parameter that is important in the direction perpendicular to the direction of movement 10B is the relative position of the tool in relation to the foundation. For example, the screed is laterally displaceable and/or extendable to the left and to the right. For example, extendable parts of the screed may be displaced to the left and to the right so as to make the road pavement follow the edges accordingly and/or to adjust the width of the road. To this end, it would be useful if also movement parameters in the direction perpendicular to the direction of movement 10B were recognized, i.e. a position in relation to the edge. If one assumes, in accordance with embodiments, that the temperature measuring device takes a perspective behind the screed, one may detect, by means of the transition from cold to warm temperatures (larger than 40° C. or larger than 80° C.) where the curve of the edge of the hot asphalt extends. As far as that goes, the movement parameter may represent an edge or a vector of an edge which represents the course of the edge of the asphalt applied. On the basis of this movement parameter, subsequent adjustment, e.g. of the width and/or of the position, is feasible. In accordance with a further embodiment, the array may also be aligned in front of the road finisher, as was already indicated. With one single roadway to be installed, the foundation will exhibit no large differences in temperature. However, if one assumes that several asphalt layers are installed adjacently to one another, a transition from warm to cold temperatures will be detectable from the previously installed asphalt layer, which is still warm, as compared to the non-preheated foundation. This edge may be detected in an analogous manner, so that it is possible to track the tool, e.g. the extendable parts of the screed, accordingly and/or to even steer the vehicle accordingly. With several asphalt lanes arranged adjacently to one another, the edge may also be well documented since here, in the direction perpendicular to the direction of movement 10B, a transition from warm to hot temperatures (larger than 3°, larger than 10°, larger than 20°, or larger than 50°) may be detected by the temperature measuring device aligned behind the screed.

With regard to the above embodiments, it shall be noted that a different movement status, such as the status "halted", "stationary" or "just re-started" may be detected. With the state "halted", it would also be feasible, for example, for a cooling process to take place in the asphalt due to the time duration, in which case the evaluation device will identify this temperature change as a cooling process rather than as a shift. This might be effected, for example, in that it is detected, in the evaluation device 43, that all of the areas within the current frame undergo uniform cooling.

With regard to the definition of the temperature zone, it shall be noted that said temperature zone typically exhibits a temperature that is approximately constant across the surface (pixels) and that is defined by an upper threshold and a lower threshold, for example. The difference between the upper and lower thresholds may include, e.g., 0.1 Kelvin, 0.5 Kelvin or 3 Kelvin or any other window. Several temperature zones are formed as spots surrounded by other temperature zones. Evaluation of the movement parameters advantageously is effected at clearly defined areas such as the center of a temperature zone and/or the center of a spot or the boundaries of the respective temperature zone, for example.

In connection with the embodiment of FIGS. 3c and/or 3d, validation of temperature measurement values was already explained. Said validation may also be effected differently. For example, the temperature measuring field may have a machine part, e.g. a footstep or an additional reference object, located therein, the temperature of which may be assumed to be known. In a first approximation, the footstep may be assumed, e.g., to have the ambient temperature or the temperature of the screed. Depending on the exact position of the footstep, e.g. at a screed or at a chassis, different assumptions regarding the temperature are to be made since the chassis obviously undergoes considerably fewer changes in temperature during operation than does the screed. In accordance with further embodiments, it would also be feasible for an element to be provided whose temperature is monitored by a sensor. Either a machine part may be monitored, or an object whose temperature is known may be positioned in the perspective of the sensor. The object may be arranged either very close to or at some distance from the corresponding sensor.

Even though in the above embodiments, it was also assumed that they are implemented as a device, it shall be pointed out here that many of said method steps may be implemented in software, i.e. as a software-implemented method. The corresponding method thus includes the steps of sensing first and second surface temperatures for two different (local) areas of a measuring field. Upon movement of the construction machine, a shift in the measuring field occurs, so that a temperature zone defined by a surface temperature within an area, e.g. within a first area, will also be shifted. Said shift in the temperature may be "tracked" over time. This yields the basic steps of determining the two surface temperatures as well as determining the shift so as to derive a movement parameter therefrom. An optional step may include identifying a temperature zone. Identification occurs at a first point in time, at which said temperature zone, too, is defined. At further points in time, the temperature zone will also be identified, but will not be newly defined.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described in connection with or as a method step also represent a description of a corresponding block or detail or feature of a corresponding device. Some or all of the method steps may be performed by a hardware device (or while using a hardware device) such as a microprocessor, a programmable computer or an electronic circuit, for example. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or do cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium or the computer-readable medium are typically concrete and/or non-transitory and/or non-transient.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU) or a graphics card (GPU), or may be a hardware specific to the method, such as an ASIC.

The devices described herein may be implemented, e.g., while using a hardware apparatus or while using a computer or while using a combination of a hardware apparatus and a computer.

The devices described herein or any components of the devices described herein may be implemented, at least partly, in hardware or in software (computer program).

The methods described herein may be implemented, e.g., while using a hardware apparatus or while using a computer or while using a combination of a hardware apparatus and a computer.

The methods described herein or any components of the devices described herein may be executed, at least partly, by hardware or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Measurement system for a construction machine, in particular a road construction machine, comprising:
a temperature measuring device configured to determine a first surface temperature for a first area of a measuring field of the temperature measuring device as well as a second surface temperature for a second area of the measuring field of the temperature measuring device, the temperature measuring device being directed to a reference surface, in relation to which the construction machine is moving, and the measuring field of the temperature measuring device being shifted as a function of a movement of the construction machine along the reference surface; and
an evaluation device configured to determine a movement parameter by means of a shift in a first temperature zone, defined for a first point in time by the first surface temperature within the first area, in relation to the first and/or second area(s) or in relation to the measuring field of the temperature measuring device;
wherein the movement parameter describes a speed or a direction of movement of the construction machine.

2. Measurement system as claimed in claim 1, wherein the evaluation device is configured to detect a movement parameter by means of a heat change or by means of a shift, based on a changing heat distribution, of the first temperature zone across the first and/or second area(s).

3. Measurement system as claimed in claim 1, wherein the shift is effected along a direction of movement of the construction machine as a result of the movement of the construction machine.

4. Measurement system as claimed in claim 1, wherein the evaluation device is configured to determine another movement parameter, namely a distance covered by the construction machine.

5. Measurement system as claimed in claim 1, wherein the evaluation device is configured to look at a shift path of the first temperature zone in relation to time so as to determine a speed of the construction machine and/or a movement of the construction machine and/or the movement parameter.

6. Measurement system as claimed in claim 1, wherein the evaluation device is configured, by means of the first surface temperature, to identify a temperature zone and to detect the shift in the first temperature zone in relation to the first and/or second area(s) or in relation to the measuring field of the temperature measuring device.

7. Measurement system as claimed in claim 1, wherein the evaluation device is configured to determine the first temperature zone over several successive points in time or over several successive frames.

8. Measurement system as claimed in claim 1, wherein the first and second areas are directly adjacent to each other and comprise different temperature zones; and/or
wherein the temperature measuring device is configured to sense at least one third surface temperature for a third area of the measuring field of the temperature measuring device.

9. Measurement system as claimed in claim 1, wherein the first and second areas and/or the first and second areas as well as a third area are arranged along an expected direction of movement.

10. Measurement system as claimed in claim 1, wherein the evaluation device is configured to detect a halted state of the construction machine when no shift has occurred and/or to detect a start-up as soon as a shift occurs.

11. Measurement system as claimed in claim 1, wherein the evaluation device is configured to compare and adjust the determined movement parameter by means of Global Navigation Satellite System (GNSS) data; and/or the measurement system comprising a Global Navigation Satellite System (GNSS) receiver which provides GNSS data, so that the evaluation device may compare and adjust the determined movement parameter by means of data.

12. Measurement system as claimed in claim 1, wherein the temperature measuring device is directed to an asphalt layer to be deposited which serves as a reference surface, and/or is configured to determine the surface temperature of the asphalt layer in at least the first and second areas during installation of the asphalt layer.

13. Measurement system as claimed in claim 1, wherein the temperature measuring device comprises at least a thermopile array or pyrometer array.

14. Measurement system as claimed in claim 1, wherein the temperature measuring device comprises at least two arrays; and/or
wherein the temperature measuring device comprises at least two adjacently arranged arrays directed to two adjacent measuring fields of the arrays.

15. Measurement system as claimed in claim 1, wherein the temperature measuring device comprises at least two adjacently arranged arrays directed to an overlapping area of the measuring fields of the arrays, and
(a) a distance H of the temperature measuring device to the reference surface may be determined by the temperature measuring device or by the evaluation device; and/or
(b) upon a change in the distance H of the temperature measuring device to the reference surface, the overlapping area of the measuring fields that is sensed by the arrays maintains its width when seen in a direction transverse to the direction of movement of the construction machine.

16. Measurement system as claimed in claim 1, wherein the movement parameter to be determined describes an edge extending along and/or essentially along the direction of movement; and/or
wherein the movement parameter describes an edge which may be determined by means of a hot/cold transition, a hot/warm transition and/or by means of two temperature areas extending along the direction of movement and/or along two temperature areas exhibiting a temperature difference larger than 3°.

17. Measurement system as claimed in claim 1, wherein the temperature measuring device comprises a measuring field which is defined, fixedly defined and/or known in relation to the construction machine; and/or
wherein the measuring field is arranged in an area located behind the construction machine; and/or
wherein the measuring field is arranged in an area located in front of the construction machine; and/or
wherein the measuring field is arranged in an area located on the side of the construction machine.

18. Construction machine, in particular road construction machine, comprising a measurement system for the construction machine, in particular a road construction machine, said measurement system comprising:
a temperature measuring device configured to determine a first surface temperature for a first area of a measuring field of the temperature measuring device as well as a second surface temperature for a second area of the measuring field of the temperature measuring device, the temperature measuring device being directed to a reference surface, in relation to which the construction machine is moving, and the measuring field of the temperature measuring device being shifted as a function of a movement of the construction machine along the reference surface; and
an evaluation device configured to determine a movement parameter by means of a shift in a first temperature zone, defined for a first point in time by the first surface temperature within the first area, in relation to the first and/or second area(s) or in relation to the measuring field of the temperature measuring device;
wherein the movement parameter describes a speed or a direction of movement of the construction machine.

19. Method of determining a movement parameter for a construction machine, in particular a road construction machine, comprising:
determining a first surface temperature for a first area of a measuring field of the temperature measuring device and determining a second surface temperature for a second area of the measuring field of the temperature measuring device by means of a temperature measuring device, said temperature measuring device being directed to a reference surface, in relation to which the construction machine is moving, and the measuring field of the temperature measuring device being shifted as a function of a movement of the construction machine along the reference surface; and
determining a movement parameter by means of a shift in a first temperature zone, defined for a first point in time by the first surface temperature within the first area, in relation to the first and/or second area(s) or in relation to the measuring field of the temperature measuring device;
wherein the movement parameter describes a speed or a direction of movement of the construction machine.

20. A non-transitory digital storage medium having a computer program stored thereon to perform the method of determining a movement parameter for a construction machine, in particular a road construction machine, said method comprising:
determining a first surface temperature for a first area of a measuring field of the temperature measuring device and determining a second surface temperature for a second area of the measuring field of the temperature measuring device by means of a temperature measuring device, said temperature measuring device being directed to a reference surface, in relation to which the construction machine is moving, and the measuring field of the temperature measuring device being shifted as a function of a movement of the construction machine along the reference surface; and
determining a movement parameter by means of a shift in a first temperature zone, defined for a first point in time by the first surface temperature within the first area, in relation to the first and/or second area(s) or in relation to the measuring field of the temperature measuring device,
wherein the movement parameter describes a speed or a direction of movement of the construction machine;
when said computer program is run by a computer.

* * * * *